United States Patent
Mohalik et al.

(10) Patent No.: US 12,457,469 B2
(45) Date of Patent: Oct. 28, 2025

(54) FIRST NODE, SECOND NODE, WIRELESS COMMUNICATIONS NETWORK AND METHODS PERFORMED THEREBY TO ACHIEVE A SET OF GOALS IN A GEOGRAPHICAL SPACE

(71) Applicant: Telefonaktiebolaget LM Ericsson (publ), Stockholm (SE)

(72) Inventors: Swarup Kumar Mohalik, Bangalore (IN); Saravanan M, Chennai (IN); Anshu Shukla, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 703 days.

(21) Appl. No.: 17/773,392

(22) PCT Filed: Oct. 30, 2019

(86) PCT No.: PCT/IN2019/050796
§ 371 (c)(1),
(2) Date: Apr. 29, 2022

(87) PCT Pub. No.: WO2021/084545
PCT Pub. Date: May 6, 2021

(65) Prior Publication Data
US 2022/0408213 A1 Dec. 22, 2022

(51) Int. Cl.
*H04W 4/021* (2018.01)
*H04W 4/024* (2018.01)
*H04W 8/24* (2009.01)

(52) U.S. Cl.
CPC ............. *H04W 4/021* (2013.01); *H04W 8/24* (2013.01); *H04W 4/024* (2018.02)

(58) Field of Classification Search
CPC ....... H04W 4/021; H04W 8/24; H04W 4/024; H04W 4/70; H04W 24/02; H04W 4/029;
(Continued)

(56) References Cited

U.S. PATENT DOCUMENTS 12,068,916 B2 * 8/2024 Kattepur ................ G06N 5/02
2010/0312388 A1 * 12/2010 Jang ..................... G05D 1/0088
700/248
(Continued)

FOREIGN PATENT DOCUMENTS

KR           102008367 B1     8/2019

OTHER PUBLICATIONS

International Search Report and Written Opinion of the International Searching Authority, PCT/IN2019/050796, mailed Jan. 31, 2020, 9 pages.
(Continued)

*Primary Examiner* — Diane D Mizrahi
*Assistant Examiner* — Jing Gao
(74) *Attorney, Agent, or Firm* — Sage Patent Group

(57) ABSTRACT

In a method performed by a first node, the node determines a plan based on: i) a first goal to be achieved according to capabilities of the first node, and a first set of first actions to be performed by the first node to achieve the first goal, and ii) for each second node of one or more second nodes: a) a respective goal to be achieved according to respective capabilities of each second node, and b) a respective set of first actions to be individually performed by each second node to achieve the respective goal. The plan is to collaboratively achieve each of the respective goals and the first goal, by determining a respective set of second actions to be respectively performed by each second node and the first node. The first node sends a respective indication indicating the determined second actions.

20 Claims, 12 Drawing Sheets

(58) Field of Classification Search
CPC ..... H04W 4/46; H04W 56/0015; H04W 4/02; H04W 4/30; H04W 4/38; H04W 4/44; H04W 12/63; H04W 4/08; H04L 67/1095; H04L 67/125; H04L 67/52; H04L 67/10; G06N 20/00; G06N 3/08; G06N 3/088; G06N 5/025; G06Q 10/087; G06Q 10/06; G06Q 10/0631; G06Q 10/0833; G06Q 10/08; G06Q 10/06316; G06Q 10/06311; G06Q 10/06315

See application file for complete search history.

(56) References Cited

U.S. PATENT DOCUMENTS

| | | |
|---|---|---|
| 2016/0068268 A1 | 3/2016 | Bookless et al. |
| 2019/0025818 A1* | 1/2019 | Mattingly ............... H04W 4/46 |
| 2019/0049975 A1 | 2/2019 | Kattepur et al. |

OTHER PUBLICATIONS

Lopez-Perez, Jose J et al., "Distributed Multirobot Exploration Based on Scene Partitioning and Frontier Selection," Mathematical Problems in Engineering, vol. 2018, Article ID 2373642, 18 pages.

Carlos Machado, "Practical SLAM for IoT is here," Internet reference dated Sep. 17, 2017, accessed at: https://www.accuware.com/blog/practical-slam-for-iot-is-here/, 7 pages.

Chen, Xieyuanli et al., "Distributed monocular multi-robot SLAM," Proceedings of 2018 IEEE $8^{th}$ Annual International Conference on CYBER Technology in Automation, Control, and Intelligent Systems, Jul. 19-23, 2018, Tianjin, China, 6 pages.

Mahdoui, Nesrine et al., "Cooperative Frontier-Based Exploration Strategy for Multi-Robot System," System of Systems Engineering (SoSE) 2018 $13^{th}$ Annual Conference, 8 pages.

Schmuck, Patrik et al, "Multi-UAV Collaborative Monocular SLAM," 2017 IEEE International Conference on Robotics and Automation (ICRA), Singapore, 2017, 8 pages.

Silva, André et al., "Monocular Trail Detection and Tracking Aided by Visual SLAM for Small Unmanned Aerial Vehicles," Journal of Intelligent and Robotic Systems, Jun. 2018, 16 pages.

Extended European Search Report dated Oct. 18, 2022 for European Patent Application No. 19950302.0, 8 pages.

First Korean Office Action for Korean Application No. 10-2022-7017994 mailed Jun. 19, 2024, 14 pages (including English translation).

\* cited by examiner a)

b)

a)

b)

FIRST NODE, SECOND NODE, WIRELESS COMMUNICATIONS NETWORK AND METHODS PERFORMED THEREBY TO ACHIEVE A SET OF GOALS IN A GEOGRAPHICAL SPACE

CROSS REFERENCE TO RELATED APPLICATIONS

This application is a 35 U.S.C. § 371 national stage application of PCT International Application No. PCT/IN2019/050796 filed on Oct. 30, 2019, the disclosure and content of which is incorporated by reference herein in its entirety.

TECHNICAL FIELD

The present disclosure relates generally to a first node, and methods performed thereby, to achieve a set of goals in a geographical space. The present disclosure also relates generally to a second node, and methods performed thereby, to achieve the set of goals in the geographical space. The present disclosure also relates generally to a wireless communications network comprising the first node and one or more second nodes comprising the second node, to achieve the set of goals in the geographical space.

BACKGROUND

Nodes within a wireless communications network may be wireless devices such as e.g., User Equipments (UEs), stations (STAs), mobile terminals, wireless terminals, terminals, Internet of Things (IoT) devices and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, such as radio network node or Base Station (BS), which sometimes may be referred to as e.g., Transmission Point (TP), Radio Base Station (RBS), gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR

The so-called 5th Generation (5G) system, from a radio perspective started to be standardized in 3GPP, and the so-called New Radio (NR) is the name for the radio interface. NR architecture is being discussed in 3GPP. In the current concept, gNB denotes an NR BS, where one NR BS may correspond to one or more transmission and/or reception points.

One of the main goals of NR is to provide more capacity for operators to serve ever increasing traffic demands and variety of applications. Because of this, NR will be able to operate on high frequencies, such as frequencies over 6 GHz, until 60 or even 100 GHz.

Operation in higher frequencies makes it possible to use smaller antenna elements, which enables antenna arrays with many antenna elements. Such antenna arrays facilitate beamforming, where multiple antenna elements may be used to form narrow beams and thereby compensate for the challenging propagation properties.

Internet of Things (IoT)

The Internet of Things (IoT) may be understood as an internetworking of communication devices, e.g., physical devices, vehicles, which may also referred to as "connected devices" and "smart devices", buildings and other items—embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as for the control and automation of lighting via e.g., cameras, light monitors, heating, e.g. a "smart" thermostat, ventilation, air conditioning, and appliances such as washer, dryers, ovens, refrigerators or freezers that may use telecommunications for remote monitoring. These devices may collect data with the help of various existing technologies and then autonomously flow the data between other devices.

Machine Type Communication (MTC)

Machine Type Communication (MTC) has in recent years, especially in the context of the Internet of Things (IoT), shown to be a growing segment for cellular technologies. An MTC device may be a communication device, typically a wireless communication device or simply user equipment, that is a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone. MTC involves communication in a wireless communication network to and/or from MTC devices, which communication typically may be of quite different nature and with other requirements than communication associated with e.g. conventional mobile phones and smart phones. In the context of and growth of the IoT, it is evident that MTC traffic will be increasing and thus needs to be increasingly supported in wireless communication systems.

An autonomous agent, or Intelligent Autonomous System, may be understood as an entity that may interact with the environment and decide actions to be performed with some degree of independence or autonomy. The autonomous agent's actions may be based on knowledge, desires or aims of a user of the autonomous agent or another entity. The actions an autonomous agent may perform may depend on the actions that the autonomous agent may support.

With systems performing Simultaneous Localization and Mapping (SLAM) from a single robot reaching considerable maturity, the possibility of employing a team of robots to collaboratively perform a task has been attracting increasing interest. [1, 2]. Autonomous agents may cooperate to take advantage of each other's capability and the resulting artifacts, which may be understood as functional outputs, such as images, thermal images, etc. . . . . . For example, in a remote reconnaissance mission, agents from different organizations may be assigned tasks independently. When they assemble in the target area, they may exchange their capabilities, know the artifacts that one produces and the other may consume, and thereby reduce the overall cost of the mission when possible through cooperating.

In such scenarios, each agent may independently explore an environment running limited-memory SLAM on board, while sending all collected information to a central server, which may be a ground station with increased computational resources [3] in a centralized architecture. The server may manage the maps of all agents, triggering loop closure, map fusion, optimization and distribution of information back to the agents. This may enable an agent to incorporate observations from others in its SLAM estimates on the fly, demonstrating the applicability of such a system in scenarios involving multiple autonomous agents. One such example has been described to perform missions in forest environments, such as in e.g., search and rescue using a monocular vision system susceptible of being installed in unmanned small and medium-sized aerial vehicles built [4].

Such systems may result in waste of time-frequency resources and battery resources, which in turn into increased latency and reduced capacity in a telecommunications network, limiting the applicability of such methods.

SUMMARY

It is an object of embodiments herein to improve the handling of tasks to be performed by intelligent autonomous agents in a wireless communications network. More particularly, it is an object of embodiments herein to improve the handling the achievement of a set of goals in a geographical space by nodes in a wireless communications network.

According to a first aspect of embodiments herein, the object is achieved by a method performed by a first node. The method is to achieve a set of goals in a geographical space. The first node operates in the wireless communications network. The first node determines a plan. The first node determines the plan based on the following. First, a first goal of the first node to be achieved in the geographical space. The first goal is to be achieved according to a first set of capabilities of the first node. Additionally, a first set of first actions to be individually performed by the first node to achieve the first goal. Second, for each second node of one or more second nodes within radio coverage of the first node: a) a respective goal to be achieved in the geographical space according to a respective set of capabilities of each second node of the one or more second nodes, and b) a respective set of first actions to be individually performed by each second node of the one or more second nodes to achieve the respective goal. The plan is to collaboratively achieve each of the respective goals and the first goal in the geographical space. The plan is to achieve this by determining a respective set of second actions to be respectively performed by each second node of the one or more second nodes and the first node. The first node also sends, to each second node of the one or more second nodes, a respective indication. The respective indication indicates the determined respective set of second actions.

According to a second aspect of embodiments herein, the object is achieved by a method performed by a second node. The method is to achieve the set of goals in the geographical space. The second node operates in the wireless communications network. The second node sends a respective first indication to the first node. The first node operates in the wireless communications network. The respective first indication indicates a respective goal of the second node to be achieved in the geographical space according to a respective set of capabilities of the second node. The respective first indication also indicates the respective set of capabilities of the second node, and a respective set of first actions to be individually performed by the second node to achieve the respective goal. The second node receives, from the first node, a respective second indication. The respective second indication indicates the set of second actions to be individually performed by the second node. The receiving of the respective second indication is based on the sent respective first indication. The received respective second indication is based on the plan to collaboratively achieve by the first node and the one or more second nodes within radio coverage of the first node the following. First, the first goal of the first node to be achieved in the geographical space according to the first set of capabilities of the first node. Second, the respective goal to be achieved in the geographical space by each of the one or more second nodes according to the respective set of capabilities of each second node of the one or more second nodes. The plan is based on the respective set of second actions to be respectively performed by each second node of the one or more second nodes and the first node.

According to a third aspect of embodiments herein, the object is achieved by the first node. The first node may be considered to be for achieving the set of goals in the geographical space. The first node is further configured to determine the plan. The first node is configured to determine the plan, based on the following. First, the first goal of the first node to be achieved in the geographical space according to the first set of capabilities of the first node. Additionally, based on the first set of first actions to be individually performed by the first node to achieve the first goal. Second, for each second node of the one or more second nodes within radio coverage of the first node: a) the respective goal to be achieved in the geographical space according to the respective set of capabilities of each second node of the one or more second nodes, and b) the respective set of first actions to be individually performed by each second node of the one or more second nodes to achieve the respective goal. The plan is to collaboratively achieve each of the respective goals and the first goal in the geographical space. The first node is configured to determine the plan by determining the respective set of second actions to be respectively performed by each second node of the one or more second nodes and the first node. The first node is also configured to send, to each second node of the one or more second nodes, the respective indication. The respective indication is configured to indicate the respective set of second actions configured to be determined.

According to a fourth aspect of embodiments herein, the object is achieved by the second node. The second node may be considered to be for achieving the set of goals in the geographical space. The second node is configured to operate in the wireless communications network. The second node is also configured to send the respective first indication to the first node configured to operate in the wireless communications network. The respective first indication is configured to indicate the following. First, a) the respective goal of the second node to be achieved in the geographical space according to the respective set of capabilities of the second node. Second, the respective set of capabilities of the second node, and third, the respective set of first actions to be individually performed by the second node to achieve the respective goal. The second node is also configured to receive, from the first node, the respective second indication. The respective second indication is configured to indicate the set of second actions to be individually performed by the second node. To receive the respective second indication is configured to be based on the respective first indication configured to be sent. The respective second indication configured to be received is configured to be based on the plan to collaboratively achieve by the first node and the one or more second nodes within radio coverage of the first node the following. First, the first goal of the first node to be achieved in the geographical space according to the first set of capabilities of the first node. Second, the respective goal to be achieved in the geographical space by each of one or more second nodes according to the respective set of capabilities of each second node of the one or more second nodes. The plan is configured to be based on the respective set of second actions to be respectively performed by each second node of the one or more second nodes and the first node.

According to a fourth aspect of embodiments herein, the object is achieved by the wireless communications network. The wireless communications network is configured to enable communication between the first node and the one or more second nodes comprising the second node for achieving a set of goals in a geographical space. The second node is configured to send the respective first indication to the first node. The respective first indication is configured to indicate the respective goal of the second node to be achieved in the geographical space according to the respective set of capabilities of the second node. The respective first indication is also configured to indicate the respective set of capabilities of the second node. The respective first indication is further configured to indicate the respective set of first actions to be individually performed by the second node to achieve the respective goal. The first node is configured to determine the plan, based on the first goal of the first node to be achieved in the geographical space according to the first set of capabilities of the first node, and the first set of first actions to be individually performed by the first node to achieve the first goal. The first node is further configured to determine the plan, based on, for each second node of the one or more second nodes within radio coverage of the first node: a) the respective goal to be achieved in the geographical space according to the respective set of capabilities of each second node of the one or more second nodes, and b) the respective set of first actions to be individually performed by each second node of the one or more second nodes to achieve the respective goal. The plan is to collaboratively achieve each of the respective goals and the first goal in the geographical space, by determining the respective set of second actions to be respectively performed by each second node of the one or more second nodes and the first node. The first node is also configured to send, to each second node of the one or more second nodes, the respective indication. The respective indication is configured to indicate the respective set of second actions configured to be determined. In such embodiments, the second node is further configured to receive, from the first node, the respective second indication. The respective second indication is configured to indicate the set of second actions to be individually performed by the second node.

By the first node determining the plan based on its own first goal and the respective goals of the one or more second nodes, and then sending the respective indication to each second node, each of the respective goals and the first goal may be achieved in the geographical space, collaboratively. This enables to determine a common plan that may more effectively achieve all the goals. For example, if two of the second nodes need to perform a first action in a same region of the geographical space, that may involve a 5 km travel for both second nodes, the first node may determine the plan so that only one of the second nodes needs to travel to region, e.g., the one having the capabilities to perform the two first actions. This way, the other second node may avoid having to travel to the region, and devote its resources instead to performing second actions in a different region of the geographical space, Therefore, the second actions to be performed may be determined to achieve the goals while using resources more effectively, such as energy resources, time resources, and time-frequency resources.

BRIEF DESCRIPTION OF THE DRAWINGS

Examples of embodiments herein are described in more detail with reference to the accompanying drawings, and according to the following description.

DETAILED DESCRIPTION

Figure 1:
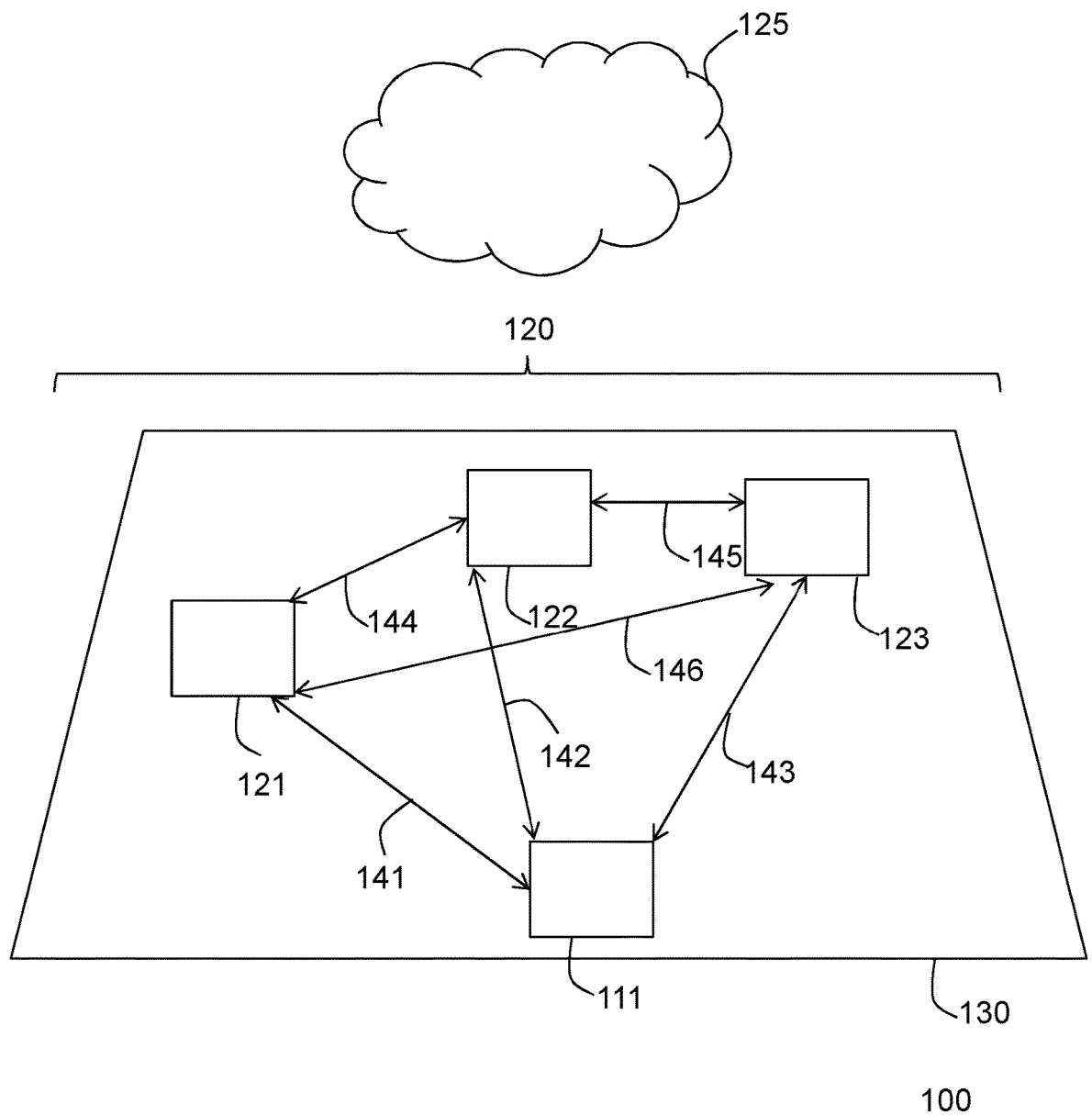
FIG. 1 is a schematic diagram illustrating a wireless communications network, according to embodiments herein.

Certain aspects of the present disclosure and their embodiments may provide solutions to the challenges discussed in the background section. There are, proposed herein, various embodiments which address one or more of the issues disclosed herein.

In the AI planning literature for multi-agent systems, there are general methods for collaborative plan synthesis and execution. The presence of multiple agents may be understood to increase the robustness of the SLAM estimation process due to sharing of information across the agents. Every agent may profit from the measurements taken by the others. However, this will complicate the SLAM implementation for multi-agent systems. The SLAM-based works described in the Background section may face some challenges related to inefficient data management, and not effective sharing of information among the agents. In general, the participating agents may preserve their autonomy running all navigation-critical tasks on board, while all computationally expensive tasks on data management are pushed to the server. A central server with potentially bigger computational capacity enables their collaboration by collecting all their experiences, merging and optimizing their maps, or disseminating information back to them, where appropriate. This may commonly result in loss of information and communication delays occurring during real missions. Therefore, the scalability and robustness will also be challenging in SLAM implementation.

Embodiments herein may be understood to address some of these challenges by making use of an opportunistic collaborative methodology to handle the challenges between autonomous agents.

In a general sense, embodiments herein may be understood to be drawn to a system and method for opportunistic collaboration between autonomous agents. Further particularly, embodiments herein may be understood to relate to a solution in the way of building opportunistic collaboration among independent agents based on knowledge bases distributed among the agents, and their twins in the edge, through protocols for exchange of information, derivation of new plans and execution of the new plans.

The cooperation that will be described herein may be understood to not be pre-planned, since it may not be known a priori which agents may encounter which others and which capabilities the agents that may be encountered may have. Therefore, in embodiments herein, there may be a dynamic and adaptive orchestration. Ad-hoc compilation of the knowledge about the objects that the agents may be able to handle and the knowledge of their capabilities may be carried out. The information exchange requirements may need knowledge about the network topology which may be taken into account for plan synthesis. Embodiments herein may involve new protocols to support a need-based collection of new knowledge items and usage of them for plan synthesis. Furthermore, since the cooperation may be understood to involve new cost elements, such as usage of other agents' capability, such cost may be taken into account for the new plans in embodiments herein.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

FIG. 1 depicts a non-limiting example of a wireless communications network 100, sometimes also referred to as a wireless communications system, cellular radio system, or cellular network, in which embodiments herein may be implemented. The wireless communications network 100 may typically be a 5G system, 5G network, NR-U or Next Gen System or network, LAA, or MulteFire. The wireless communications network 100 may alternatively be a younger system than a 5G system. The wireless communications network 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, Narrow Band Internet of Things (NB-IoT), Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), and/or any cellular network or system.

Thus, although terminology from 5G/NR and LTE may be used in this disclosure to exemplify embodiments herein, this should not be seen as limiting the scope of the embodiments herein to only the aforementioned systems.

The wireless communications network 100 may comprise a plurality of nodes, whereof a first node 111 and one or more second nodes 120 are depicted in the non-limiting example of FIG. 1. The one or more second nodes 120 may comprise a second node 121. In the particular non-limiting example of FIG. 1, the one or more second nodes 120 further comprise another second node 122, and a further second node 123.

Any of the first node 111 and the one or more second nodes 120 may be wireless device, e.g., a 5G UE, with wireless capability, that is, enabled to communicate wirelessly in the wireless communications network 100. The communication may be performed e.g., via a RAN, and possibly the one or more core networks, which may be comprised within the wireless communications network 100. Any of the first node 111 and the one or more second nodes 120 may be an intelligent autonomous system enabled to transport itself in the air, unmanned. Any of the first node 111 and the one or more second nodes 120 may be also referred to herein as an agent.

Any of the first node 111 and the one or more second nodes 120 may be able to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. Any of the first node 111 and the one or more second nodes 120 may have beamforming capability itself. In some examples, any of the first node 111 and the one or more second nodes 120 may be a distributed node, such as a virtual node in the cloud 125, and it may perform its functions entirely on the cloud 125, or partially, in collaboration with a radio network node.

Any of the first node 111 and the one or more second nodes 120 may be enabled to communicate with each other using, e.g., an IEEE 802.15.4-based low-power short-range network such as IPv6 over Low-Power Wireless Personal Area Networks (6LowPAN), Zigbee, Z-Wave, Bluetooth Low Energy (BLE), and/or any cellular network or system. Any of the first node 111 and the one or more second nodes 120 may also be able to carry out communications through a set of protocols. The set of protocols may comprise protocols for radio based communication and connection to the cloud resources. The set of protocols may alternatively or additionally comprise protocols for LAN/PAN to discover and identify other agents in the vicinity and exchange knowledge.

The wireless communications network 100 covers a geographical space 130. Any of the first node 111 and the one or more second nodes 120 may be an intelligent autonomous system enabled to navigate the geographical space 130.

The first node 111 may be configured to communicate in the wireless communications network 100 with the second node 121 over a first link 141, e.g., a radio link. The first node 111 may be configured to communicate in the wireless communications network 100 with the another second node 122 over a second link 142, e.g., a radio link. The first node 111 may be configured to communicate in the wireless communications network 100 with the further second node 123 over a third link 143, e.g., a radio link. The second node 121 may be configured to communicate in the wireless communications network 100 with the another second node 122 over a fourth link 144, e.g., a radio link. The another second node 112 may be configured to communicate in the wireless communications network 100 with the further second node 123 over a fifth link 145, e.g., a radio link.

The link, e.g., radio links, between any of the first node 111 and the one or more second nodes 120 are not depicted in FIG. 1 in order to simplify the Figure.

Figure 2:
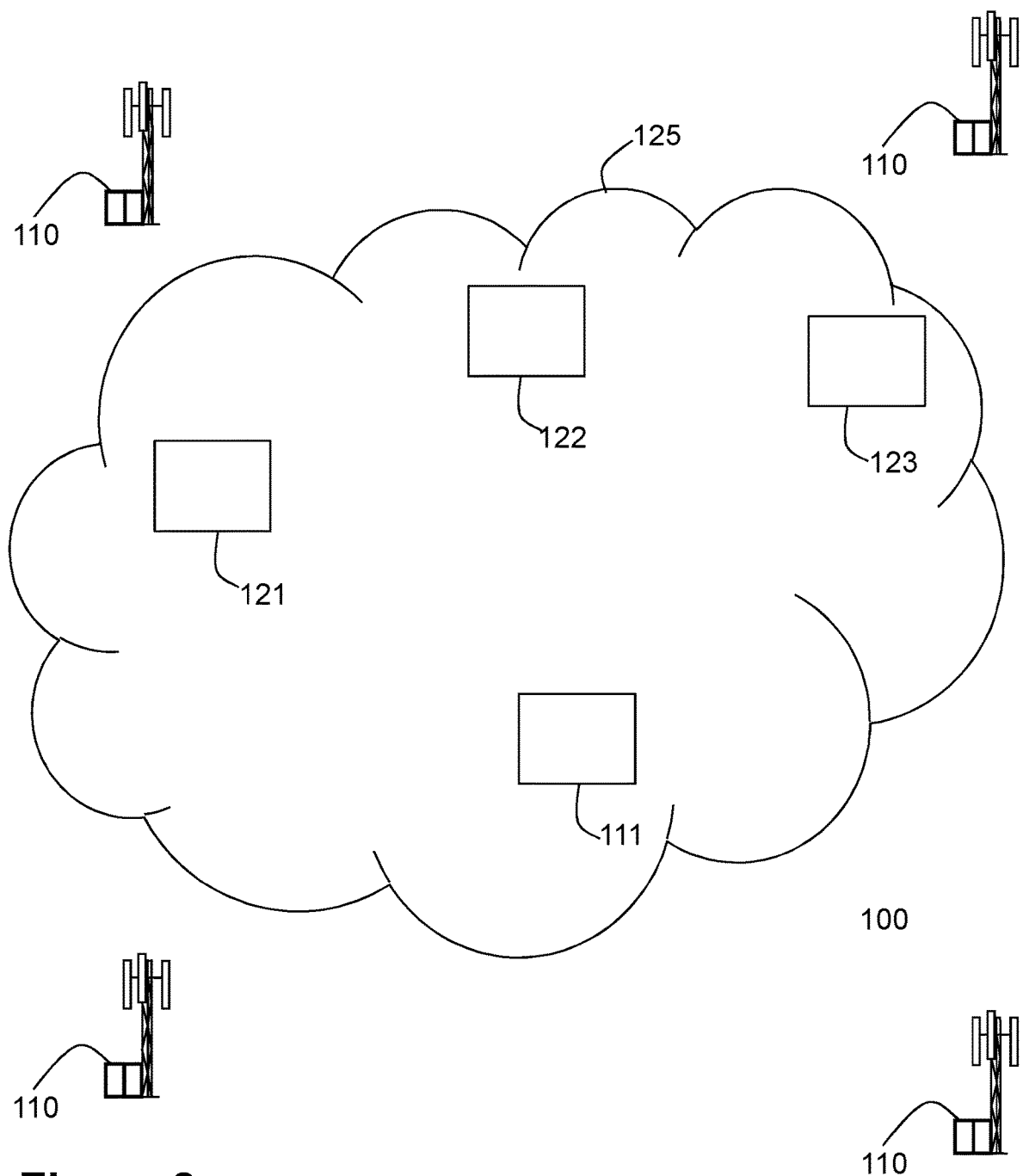
FIG. 2 is a schematic diagram illustrating another non-limiting example of a wireless communications network, according to embodiments herein.

FIG. 2 depicts another non-limiting example of the wireless communications network 100 in which embodiments herein may be implemented. As depicted in FIG. 2, the wireless communications network 100 may also comprise one or more network nodes 110. Any of the one or more network nodes 110 may be a radio network node or a radio base station, or any other network node with similar features capable of serving any of the first node 111 and the one or more second nodes 120 or any other a user equipment, such as a wireless device or a machine type communication device. Any of the one or more network nodes 110 may typically be a Transmission Point (TP) or any other network unit capable to serve, any of the first node 111 and the one or more second nodes 120 in the wireless communications network 100. Each of the one or more network nodes 110 may be e.g., a gNB, a 4G eNB, or a 5G eNB. Any of the one or more network nodes 110 may be of different classes, such as, e.g., macro base station (BS), home BS or pico BS, based on transmission power and thereby also cell size. For example, any of one or more network nodes 110 may be e.g., a Wide Area Base Station, Medium Range Base Station, Local Area Base Station and Home Base Station, based on transmission power and thereby also coverage size. Any of the one or more network nodes 110 may be a stationary relay node or a mobile relay node. Any of the one or more network nodes 110 may support one or several communication technologies, and its name may depend on the technology and terminology used. Any of the one or more network nodes 110 may be directly connected to one or more networks and/or one or more core networks, which are not depicted in FIG. 2 to simplify the Figure. The geographical space 130 may be divided into cell areas, wherein each cell area may be served by a network node, although, one radio network node may serve one or several cells. In the particular non-limiting example of FIG. 2, the first node 111 and the one or more second nodes 120 are in a non-coverage area of the one or more network nodes 110, as may be the case when for example the geographical space 130 where the first node 111 and the one or more second nodes 120 may perform operations in a remote location.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", "fifth" and/or "sixth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

Figure 3:
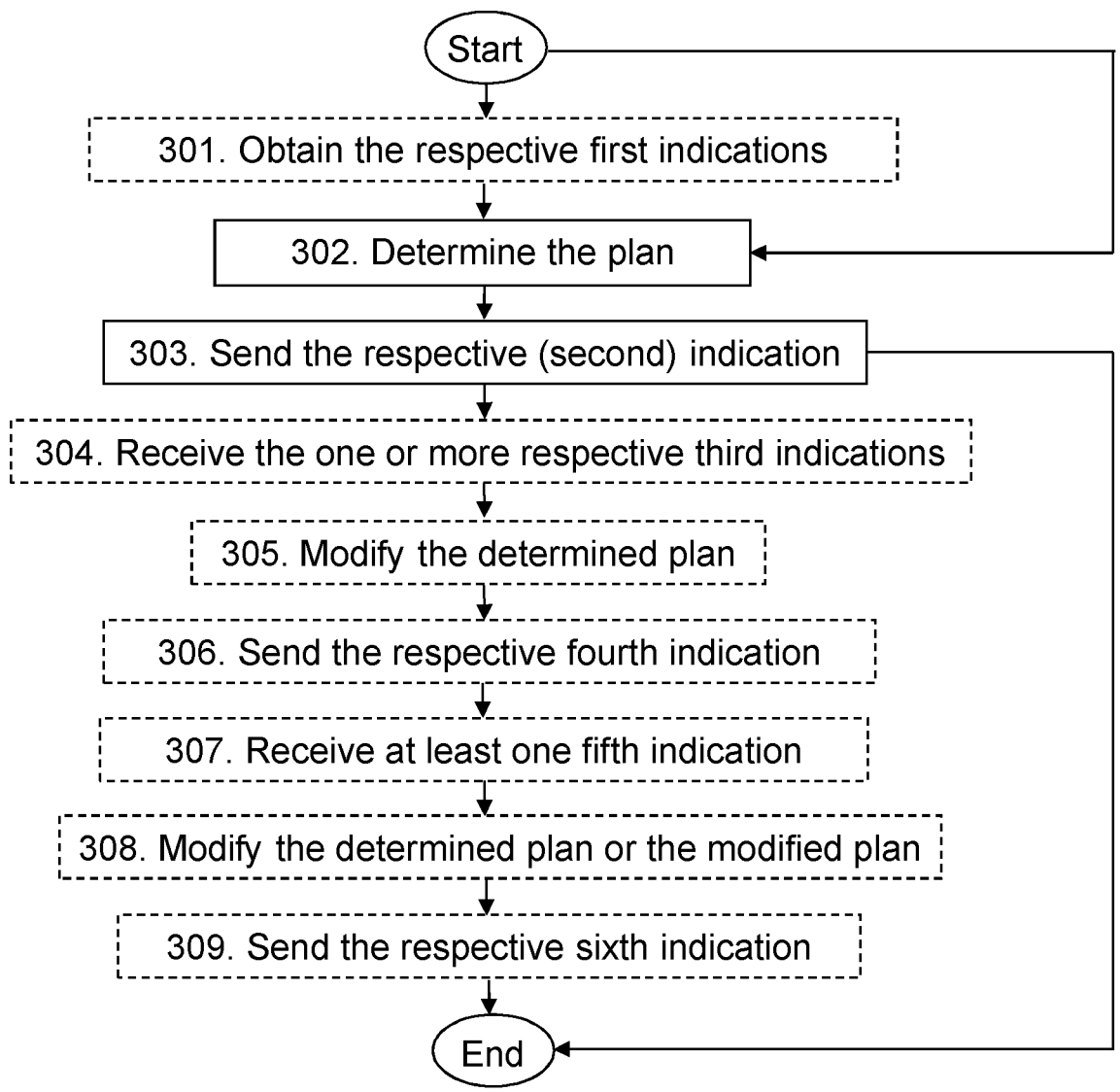
FIG. 3 is a flowchart depicting a method in a first node, according to embodiments herein.

Embodiments of method, performed by the first node 111, will now be described with reference to the flowchart depicted in FIG. 3. The method may be understood to be to achieve a set of goals in the geographical space 130. The first node 111 operates in the wireless communications network 100.

The method may comprise the actions described below. In some embodiments some of the actions may be performed. In some embodiments all the actions may be performed. In FIG. 3, optional actions are indicated with a dashed box. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 301

Each of the first node 111 and the one or more second nodes 120 may have a mission to carry out in the geographical space 130. The mission may be understood as herein as an aim or objective to be achieved in the geographical space 130. For example, a mission may be "collect low resolution images in the geographical space 130". The mission of each of the first node 111 and the one or more second nodes 120 may have been set by a respective operator of each of the first node 111 and the one or more second nodes 120.

In the course of operations in the wireless communications network 100, the first node 111 and the one or more second nodes 120 may therefore approach and/or find themselves in the geographical space 130. Any of the first node 111 and the one or more second nodes 120 may be capable of discovering the presence of other nodes at the start of their mission in the geographical space 130.

Any of the first node 111 and the one or more second nodes 120 may therefore discover one or more of the other nodes in its vicinity. Once they have discovered each other, the first node 111 and the one or more second nodes 120 may elect a leader using, for example, a distributed leader election protocol. For illustrative purposes, the first node 111 may have been elected the leader in embodiments herein.

Agent Knowledge Base

Each of the first node 111 and the one or more second nodes 120 may comprise a database, also known herein as knowledge base, which may comprise information to support their operation, e.g., in the geographical space 130. Any of the first node 111 and the one or more second nodes 120 may have to host the knowledge base due to the need of ad-hoc collaboration and the possibility of entering areas of no-coverage. The services for serving network topology and coverage information may be hosted in the cloud 125. Each of the first node 111 and the one or more second nodes 120 may comprise one or more of the following in their respective knowledge base:

1. Topology of the geographical space 130, including position of the one or more network nodes 110, e.g., repeater base stations, that may be located in the vicinity;
2. Autonomous localization and navigation capability;
3. Address of a central server in the cloud 125;
4. A PDDL domain that may comprise the models of the actions that the respective node of the first node 111 and the one or more second nodes 120 may be able to perform. A model of an action may be understood as a pair <precondition, effect>. Precondition and effect may be understood as a set of logical predicates. An action may be understood to be enabled in a state only if the precondition predicates are true in the state. When the action is executed, the effect predicates become true. In the context of this disclosure, to facilitate the description of embodiments herein, the term capability, or capabilities, is used to refer to the action, or actions, respectively, that may be supported by a node. The term "action", or "actions", in small capitals, with respect to the first actions, second actions, third actions, and fourth actions that will be described later, may be used to refer to the particular supported action, or actions to be executed, e.g., for a particular mission, by a node, of all the actions supported by the node. Examples of capabilities may be camera, both high and low resolution, soil quality detection, and/or nutrient spray. In each second node of the one or more second nodes 120, firmware may be understood to expose a set of capabilities through Application Program Interfaces (APIs). Any of the first node 111 and the one or more second nodes 120 may maintain its respective capabilities in terms of <precondition, effect> pairs in a respective knowledge base. For example, an action may be to take a high resolution image, to measure light intensity, to take a low resolution image, to enhance an image, to process an image, etc. In some embodiments, the actions may comprise at least one of: self-actions, proxy-actions, goto actions, and transfer actions, such as e.g., copy. Self-actions may be understood to refer to actions performed autonomously by the respective second node. Proxy-actions may be understood as actions carried out for other second nodes. Goto actions may be understood as actions that describe a mobility action to take a particular node from a position to another. Transfer actions may be understood as actions that describe a transfer of information from a source, e.g., one of the nodes or a central server, about an "artifact" to a target, which may be another node or the central server. The action may release the storage that may be required for the artifact in the source agent. The actions may be modeled as <precondition, effect> pairs. Specifically, the action models may comprise:

a. (goto agent from to): an action that describes a mobility action to take the agent from a position "from" to a position "to";
b. (transfer agent artifact target): an action that describes transfer of information from the source (agent or central server) about an "artifact" to the target;
c. (copy agent artifact target): an action that may be understood to be similar to transfer but does not release the storage. This may be used to transfer the same knowledge to multiple target nodes;
d. Predicate (know agent artifact): a predicate which may assert the fact that an agent has acquired knowledge about an artifact. Such knowledge may be obtained through direct actions such as (take-image agent artifact) or from other agents or central server through the exchange action;
e. Since the storage may be understood to have limits on the number of artifacts, the direct actions may be understood to have pre-conditions on the availability; and
f. Cost of each action. Each action may be understood to have a cost associated with it. The cost may be understood as a function that may be understood to attach a real number to each action. This may be used to derive plans with optimal cost or plans within certain cost bounds. The exact values of actions may be understood to depend upon the domain and the intentions of the operator. For example, the cost may model energy consumed, or financial cost, or distance need to be travelled to execute the actions etc.

In particular examples, the respective knowledge base may comprise all the information listed above in items a-f.

After discovering each other, any of the first node 111 and the one or more second nodes 120 may exchange their capabilities. Each of the first node and the one or more second nodes 120 may have derived a plan, e.g., with a respective planner, to accomplish the respective mission in the geographical space. Each of the first node and the one or more second nodes 120 may analyze their respective plans to derive the need to have desired effects, and the time bounds by which the effects may need to take place. The requirements of timed-effects may then be exchanged with the other nodes.

In accordance with this, in this Action 301, the first node 111 may obtain, respectively from each second node of the one or more second nodes 120, one or more respective first indications. Each of the one or more respective first indications may indicate, respectively, for each second node of the one or more second nodes 120: a) a respective goal to be achieved in the geographical space 130 according to a respective set of capabilities of each second node of the one or more second nodes 120, b) a respective set of capabilities, and c) a respective set of first actions to be individually performed by each second node of the one or more second nodes 120 to achieve the respective goal.

A goal, also known as mission, may be understood herein as an aim to be achieved in the geographical space 130, as mentioned earlier. The goal may be defined by a "know" predicate that may specify reconnaissance knowledge about the artifacts in the geographical space 130. For example, a goal may be stated in PDDL as: (know Agent1 lowres-image1), (know Agent1 lowres-image2), (know Agent1 lowres-image3), and (know Agent1 lowres-image4).

The goal may be in turn defined by a "mission" that may be set by a respective operator of each second node of the one or more second nodes 120 and/or or the first node 111. Each of the first node 111 and the one or more second nodes 120 may have a planner that may be able to produce a plan, given an initial state, that is, a set of predicates denoting a position, battery state, memory, etc. of the respective second node and/or first node 111 prior to initiating the mission, and encoding the topology, and a final state, or, "goal". It may be noted that while the goal may have to achieved by a sequence of actions, an effect may be understood to be achieved to a single action. A plan may be understood a sequence of actions, which may enable a particular node to achieve a goal or goals. The planner in each second node of the one or more second nodes 120 and/or the first node 111 may use a respective PDDL domain of the action models to derive the plan. The plan may be understood to depend on the respective set of capabilities of a respective node of the first node 111 and the one or more second nodes 120.

In some embodiments, each of the one or more respective first indications may be a file with a Planning Domain Definition Language (PDDL) format, which may have been outputted by the respective planner in the respective second node. In other words, in this Action 301, the one or more second nodes 120 may supply their PDDL domains and goals to the first node 111, e.g., as leader agent.

The obtaining in this Action 301 may be implemented through a peer-to-peer, or broadcast, protocol, e.g., via one or more of the first link 141, the second link 142 and the third link 143.

Action 302

In this Action 302, the first node 111 determines a plan. The plan may be understood to provide a sequence of actions that may take one or more nodes, e.g., the first node 111 and one or more second nodes 120, from a current or initial state, to a state satisfying the goal of a mission. Thus, the plan may be seen as an implementation of a mission specification. In this case, the mission is no longer a respective mission of a respective, individual, node, but is a global mission, compiled based on the individual missions of the first node 111 and the one or more second network nodes 120. Accordingly, the first node 111 determines the plan based on a first goal of the first node 111 to be achieved in the geographical space 130 according to a first set of capabilities of the first node 111, and a first set of first actions to be individually performed by the first node 111 to achieve the first goal. The first node 111 determines the plan further based on, for each second node of one or more second nodes 120 within radio coverage of the first node 111: a) the respective goal to be achieved in the geographical space 130 according to the respective set of capabilities of each second node of the one or more second nodes 120, and b) the respective set of first actions to be individually performed by each second node of the one or more second nodes 120 to achieve the respective goal. The plan is to collaboratively achieve each of the respective goals and the first goal in the geographical space 130, by determining a respective set of second actions to be respectively performed by each second node of the one or more second nodes 120 and the first node 111. In other words, the first node 111, in this Action 302 may compute a plan from a single goal constructed by the first node 111, by considering all the respective goals from the one or more second nodes 120. The first node 111 may construct the single goal by taking the union of all the respective goals from the first node 111 and the one or more second nodes 120.

Determining may be understood as calculating, deriving, selecting, or similar. The determining in this Action 302 may be performed by e.g., using a planner in the first node 111. In examples herein, the planner may be an off-the-shelf Artificial Intelligence (AI) planner, such as e.g., Metric-FF, that may take a Planning Domain Definition Language (PDDL) domain, a PDDL problem and may then generate a plan.

In some embodiments, each of the first node 111 and the one or more second nodes 120 may be Intelligent Autonomous Systems. The determining in this Action 302 may be triggered by at least one of the first node 111 and the one or more second nodes 120 discovering each other. In some of such embodiments, the determining in this Action 302 may then be based upon the first node 111 being chosen the leader of the one or more second nodes 120.

In some embodiments, the determined plan may be based on the obtained one or more respective first indications. It may be noted that the "know" predicates, the actions "goto", "copy" and "transfer" may be common to all the one or more second nodes 120 and the first node 111. In some embodiments, each of the one or more respective first indications may be a file with a PDDL format, and the determining in this Action 302 of the plan may comprise constructing a single file with PDDL format comprising all the first actions.

The second actions may be understood as being different actions than the first actions for at least one of the one or more second nodes 120 or for the first node 111. The respective set of second actions may comprise actions to provide the required effects of other second nodes of the one or more second nodes 120. The second actions may alternatively or additionally comprise skipping some of the respective set of first actions, and/or execute actions to exchange the information, which may require movement to rendezvous points or network coverage areas.

In some embodiments, the determining in Action 302 may be based on a first cost of the respective sets of first actions and a second cost of the respective sets of second actions. Since any of the one or more second nodes 120 and/or the first node 111 may be able to offer their own actions for other nodes, there may be two costs per action, namely, <actual cost, sale cost>. The first node 111 may be understood to aim at achieving the mission goals while minimizing the mission cost. The mission cost may be calculated from the plan where actions may be annotated with a bit: 0 for self-actions and 1 for proxy-actions, and then adding up the actual costs of all the actions and subtracting the sale costs of proxy actions. There may be a constraint that sale cost may need to be >=actual cost. That is, actions may not be offered at less than the actual cost.

The first node 111 may decompose the plan for each of the first node 111 and the one or more second nodes 120 by projecting each second action according to a parameter of each of the first node 111 and the one or more second nodes 120. In other words, each action may be understood to have a parameter that may denote an identifier for a node, e.g., an "nodetid". The plan when projected for a particular node "N" may be understood to be a new plan which has only those actions that have a nodeid=N.

Action 303

In this Action 303, the first node 111 sends, to each second node of the one or more second nodes 120, a respective indication, which may be considered a respective second indication. The respective indication may indicate the determined respective set of second actions. The respective indication may be understood as a respective second indication.

The respective indication may be understood as the decomposed plan to the respective second node of the one or more second nodes 120. The respective indication may also indicate a set of new requirements. Thus, in lieu of the original sequence of actions, any of the first node 111 and one or more second nodes 120 may execute new actions, e.g., to provide the required effects of other nodes, and/or they may skip some of the older tasks whose effects may be now provided by other nodes.

In this Action 310, the sending may be implemented, e.g., via one or more of the first link 141, the second link 142 and the third link 143.

Action 304

Simultaneously to the first node 111 determining the plan in Action 302, each of the one or more second nodes 120 may also compute their own local plans with their own domains and their own planners. Each of the one or more second nodes 120 may independently derive new plans in a best effort basis, incrementally, and exchange the information that they may be able to fulfill the others' requirements. In some examples, the best effort basis may be deriving a plan with a lowest cost. However, this may not need to be necessarily so. Deriving plans may take time. Hence, if there is a low time budget, the derived plan may not correspond to the lowest cost one.

After they each receive their respective second indication, each of the one or more second nodes 120 may annotate the second actions in the set of second actions as self-actions or proxy-actions, by checking the dependency of their respective original goals and their respective first actions in the plan. Each of the one or more second nodes 120 may compute the total plan cost, and compare with the cost of their respective local plan. During this computation, if there are exchange actions, then the new actions of moving to rendezvous points or coverage areas of the wireless communications network 100 may be included and their cost may be taken into account. When there is an action to exchange using the edge, digital twins may be used to emulate the peer-to-peer information exchange.

If the new plan has less cost, the respective second node of the one or more second nodes 120 may send a consent to the first node 111, e.g., the leader. Else, the respective second node of the one or more second nodes 120 may send a disagreement.

Accordingly, in this Action 304, the first node 111 may receive, respectively from each second node of the one or more second nodes 120, one or more respective third indications. Each of the one or more respective third indications may indicate, respectively, for each second node of the one or more second nodes 120 a consent or a disagreement to perform the respective set of second actions. In other words, each respective third indication may comprise a response to the respective second indication sent by the first node 111.

In this Action 304, the receiving may be implemented, e.g., via one or more of the first link 141, the second link 142 and the third link 143.

Action 305

If there is a disagreement, the first node 111 may note the agreeing second nodes only and may then construct again a new single PDDL domain out of all the actions from the agreeing second nodes.

There may be various possible alternatives in the collaboration plan synthesis procedure.

According to a first alternative, the disagreement by a second node may be only for a subset of proxy-actions. Then the first node 111, may try to re-plan taking this into account. This may result in plans where the proxy-actions may be assigned to a different second node. It may be understood that a plan is always possible, because to start with, local plans may be possible to achieve the local goals of each second node. Therefore, in the worst case, the first node 111 may produce a collection of local plans. The first alternative is illustrated later in FIG. 7.

According to a second alternative, the first node 111 may partition and assign the mission goals to any of the one or more second nodes 120 who may synthesize the plans locally. They may then annotate the actions as self-actions or proxy-actions by checking the dependency of its original goals and the actions in the plan, compute the total plan cost, and compare with the cost of the local plan. If the new plan has less cost, the second node may send a consent to the first node 111. Else, it may send a disagreement. The second nodes may disagree on the set of goals assigned to them, in which case the re-planning may start after the first node 111 may reassign the goals for the agreeing second nodes, as shown illustrated later in FIG. 8.

The disagreement of a specific node to perform the respective plan, or one or more respective second actions may be due to different reasons. In some examples, it may have to do with cost. In other examples, the disagreement may also be due to predefined policies by the nodes. For example, a node may have been configured to do only action X on behalf of others but not action Y. A similar situation may apply with the goals. The disagreement with respect to actions and goals may be understood to be independent. It may be possible for a node to agree with the goals but disagree with specific second actions. It may also be possible for a node to agree with all the second actions but not agree with a new goal assigned.

In accordance with the foregoing, in some embodiments, at least one of the respective third indications may indicate a disagreement to perform the respective set of second actions. In some of these embodiments, in this Action 305, the first node 111 may modify the determined plan according to the received one or more respective third indications. The first node 111 may modify the determined plan by at least one of: i) excluding any of the one or more second nodes 120 having indicated a disagreement to perform the respective set of second actions, and ii) assigning the second actions that any of the one or more second nodes 120 have disagreed to perform, to other second nodes of the one or more second nodes 120.

The modifying in this Action 305 may be performed by the planner in a similar fashion as the determining of Action 302

Action 306

In this Action 306, the first node 111 may send, to each second node of the one or more second nodes 120 having indicated a consent to perform at least one of the respective set of second actions, a respective fourth indication. The respective fourth indication may indicate a respective set of third actions to be performed according to the modified plan.

The agreeing second nodes may then follow the new plans as suggested by the first node 111, e.g., the leader. The disagreeing second nodes may follow their own plans.

In this Action 406, the sending may be implemented, e.g., via one or more of the first link 141, the second link 142 and the third link 143.

Action 307

During the execution of the method, hazards may be encountered, which may require re-planning. An execution unit in each of the first node 111 and any of the one or more second nodes 120 may keep track of the plan execution and flag when preconditions of actions may not be satisfied. For example, when transfer/copy to the cloud service may need to be done, the plan may include "goto" actions for any of the first node 111 and the one or more second nodes 120 to move to a coverage point. However, since coverage status may change dynamically, the execution may fail if there is no coverage at the specified position. Planned actions may also fail because of failure of the capabilities in any of the first node 111 and the one or more second nodes 120. For example, the camera on one of the nodes may fail and hence the proxy-actions that may require image-taking may not be able to be carried out. When transfer/copy to cloud service may fail due to non-coverage, one of the nodes may dynamically decide an alternative coverage point using the topology knowledge, unless the movement to the new point may require a large amount of time.

The cloud service may transfer the knowledge of an artifact to a target node. If the first transfer/copy to the cloud service has failed, the target node may deduce this from a time-out from the cloud service and re-plan locally to acquire the knowledge of the artifact. When transfer/copy to other another node may fail due to failure in capabilities, the node may nevertheless move to the rendezvous point as specified in the plan and inform the target node about the failure. The target agent may then locally re-plan to achieve the knowledge of the artifact under consideration. Any failure in a local action may then trigger a local re-planning.

According to the foregoing, in this Action 307, the first node 111, may receive at least one fifth indication from any of the one or more second nodes 120. The fifth indication may indicate a failure in the execution of any of the plan and the modified plan.

In this Action 307, the receiving may be implemented, e.g., via one or more of the first link 141, the second link 142 and the third link 143.

Action 308

In this Action 308, the first node 111 may modify any of the determined plan and the modified plan according to the received fifth indication.

Action 309

In Action 309, the first node 111 may send, to each second node of the one or more second nodes 120 having indicated a consent to perform at least one of the respective set of second actions, a respective sixth indication. The respective sixth indication may indicate a respective set of fourth actions to be performed according to the modified original determined plan or the remodified plan.

To summarize the foregoing, embodiments herein may be understood to be related to building an opportunistic collaboration between multiple autonomous agents.

In this Action 309, the sending may be implemented, e.g., via one or more of the first link 141, the second link 142 and the third link 143.

Execution of Collaborative Plans

At the end of the collaborative plan synthesis phase, all of the first node 111 and the one or more second nodes 120 may possess a respective plan, the global plan, the modified plan, or the local plan, that may comprise self-actions, proxy-actions, goto and transfer/copy actions. An execution module in each of the first node 111 and the one or more second nodes 120 may ensure orderly execution of the plan with the following notes:

1. Self-actions may be understood as local actions that may be executed by the each of the first node 111 and the one or more second nodes 120, independently of each other.

2. Transfer/copy between any of the first node 111 and the one or more second nodes 120 may be understood as a joint action, for which the previous local actions may be goto actions to a common position. Any of the first node 111 and the one or more second nodes 120 may be required to execute the goto actions to go to the common place, wait until the participating node arrives, transfer/copy the artifacts and then signal completion to each other.

3. Transfer/copy to the cloud service may only be done when the node may be in a communication coverage area. The plan may ensure this by issuing a goto action for the agent in case it may not be in the required coverage area.

4. The PDDL domain may model strategic actions. The actual implementation of these high level actions may be performed by low level routines with further restrictions such as collision avoidance. For example, a PDDL action may instruct a node to "move A B", meaning move from point A to point B. This may be executed by software routines driving the motors of the node and navigating. While doing so, if there are obstacles on the way, these routines may be understood to perform the tactical manoeuvres.

Figure 4:
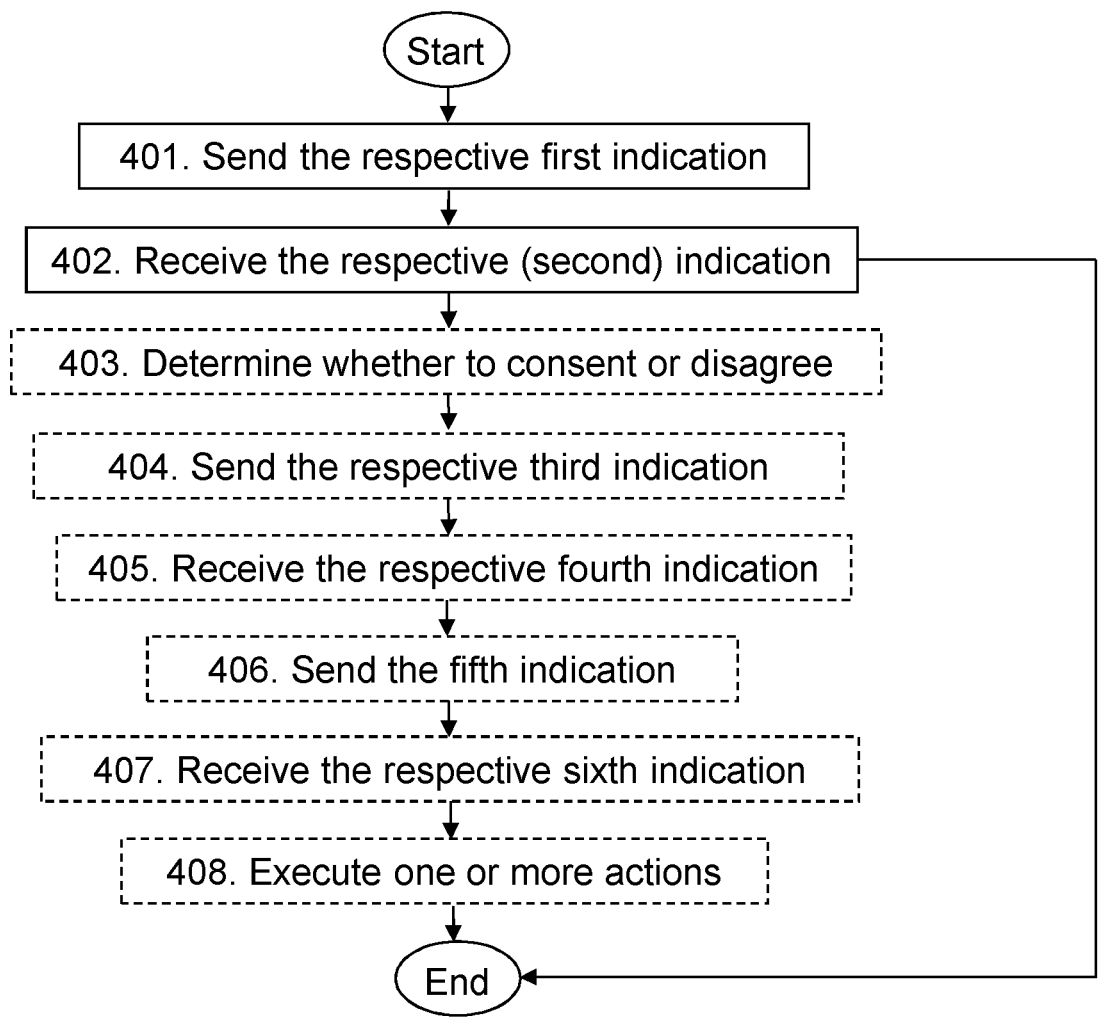
FIG. 4 is a flowchart depicting a method in a second node, according to embodiments herein.

Embodiments of a method performed by the second node 121, will now be described with reference to the flowchart depicted in FIG. 4. The method is to achieve the set of goals in the geographical space 130. The second node 121 may operate in the wireless communications network 100.

The method may comprise the following actions. Several embodiments are comprised herein. In some embodiments, some actions may be performed, in other embodiments, all actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are represented in boxes with dashed lines.

The detailed description of some of the following corresponds to the same references provided above, in relation to the actions described for the first node 111, and will thus not be repeated here to simplify the description. For example, in some examples, each of the first node 111 and the one or more second nodes 120 may be Intelligent Autonomous Systems.

Action 401

In this Action 401, the second node 121 sends a respective first indication to the first node 111 operating in the wireless communications network 100. The respective first indication indicates: a) a respective goal of the second node 121 to be achieved in the geographical space 130 according to a respective set of capabilities of the second node 121, and b) the respective set of capabilities of the second node 121, and c) a respective set of first actions to be individually performed by the second node 121 to achieve the respective goal.

The sending in this Action 401 may be performed e.g., via the first link 141.

The actions may comprise at least one of: self-actions, proxy-actions, goto actions, and transfer actions.

Action 402

In this Action 402, the second node 121 receives from the first node 111, a respective second indication, that its, its respective second indication. The respective second indication indicates a set of second actions to be individually performed by the second node 121. The receiving in this Action 402 of the respective second indication is based on the sent respective first indication. The received respective second indication is based on the plan to collaboratively achieve, by the first node 111 and the one or more second nodes 120, within radio coverage of the first node 111: i) the first goal of the first node 111 to be achieved in the geographical space 130 according to a first set of capabilities of the first node 111, and ii) the respective goal to be achieved in the geographical space 130 by each of one or more second nodes 120 according to the respective set of capabilities of each second node of the one or more second nodes 120. The plan is based on the respective set of second actions to be respectively performed by each second node of the one or more second nodes 120 and the first node 111.

The receiving in this Action 403 may be performed e.g., via the first link 141.

In some embodiments, the respective first indication may be a file with PDDL format.

Each of the first node 111 and the one or more second nodes 120 may be Intelligent Autonomous Systems. In some of these embodiments, the receiving in this Action 402 may be based upon the first node 111 being chosen the leader of the one or more second nodes 120.

Action 403

In this Action 403, the second node 121 may determine whether or not to consent or disagree to perform the respective set of second actions based on a respective first cost of the respective set of first actions and a respective second cost of the respective set of second actions, as explained above in regards to Action 303.

Determining may be understood as e.g., calculating, estimating, or deriving.

The determining in this Action 403 may be implemented by, as described earlier, taking into consideration: a) the cost of the respective set of second actions, and/or b) whether the proxy actions or new goals are not according to predefined policy of the second node 121.

Action 404

The second node 121, in this Action 404, may send a respective third indication to the first node 111. The respective third indication may indicate the determined consent or disagreement to perform the respective set of second actions, that is, based on a result of Action 403.

The sending in this Action 404 may be implemented, e.g., via the first link 141.

Action 405

In this Action 405, the second node 121 may receive a respective fourth indication from the first node 111. The respective fourth indication may indicate a respective set of third actions to be performed according to the plan, modified based on at least one of: i) at least one of the one or more second nodes 120 having indicated a disagreement to perform the respective set of second actions, and ii) at least one of the one or more second nodes 120 having disagreed to perform at least one of the respective set of second actions.

The receiving in this Action 405 may be performed e.g., via the first link 141.

Action 406

In this Action 406, the second node 121 may send a fifth indication to the first node 111. The fifth indication may indicate a failure in the execution of any of the respective set of first actions or the respective set of second actions.

The sending in this Action 406 may be performed e.g., via the first link 141.

Action 407

In this Action 407, the second node 121 may receive, from the first node 111 a respective sixth indication. The respective sixth indication may indicate a respective set of fourth actions to be performed according to the modified original determined plan or the remodified plan.

The receiving in this Action 407 may be performed e.g., via the first link 141.

Action 408

The second node 121, in this Action 408, may execute one or more actions of the respective set of second actions, the respective set of third actions, and the respective set of fourth actions, as described earlier.

Figure 5:
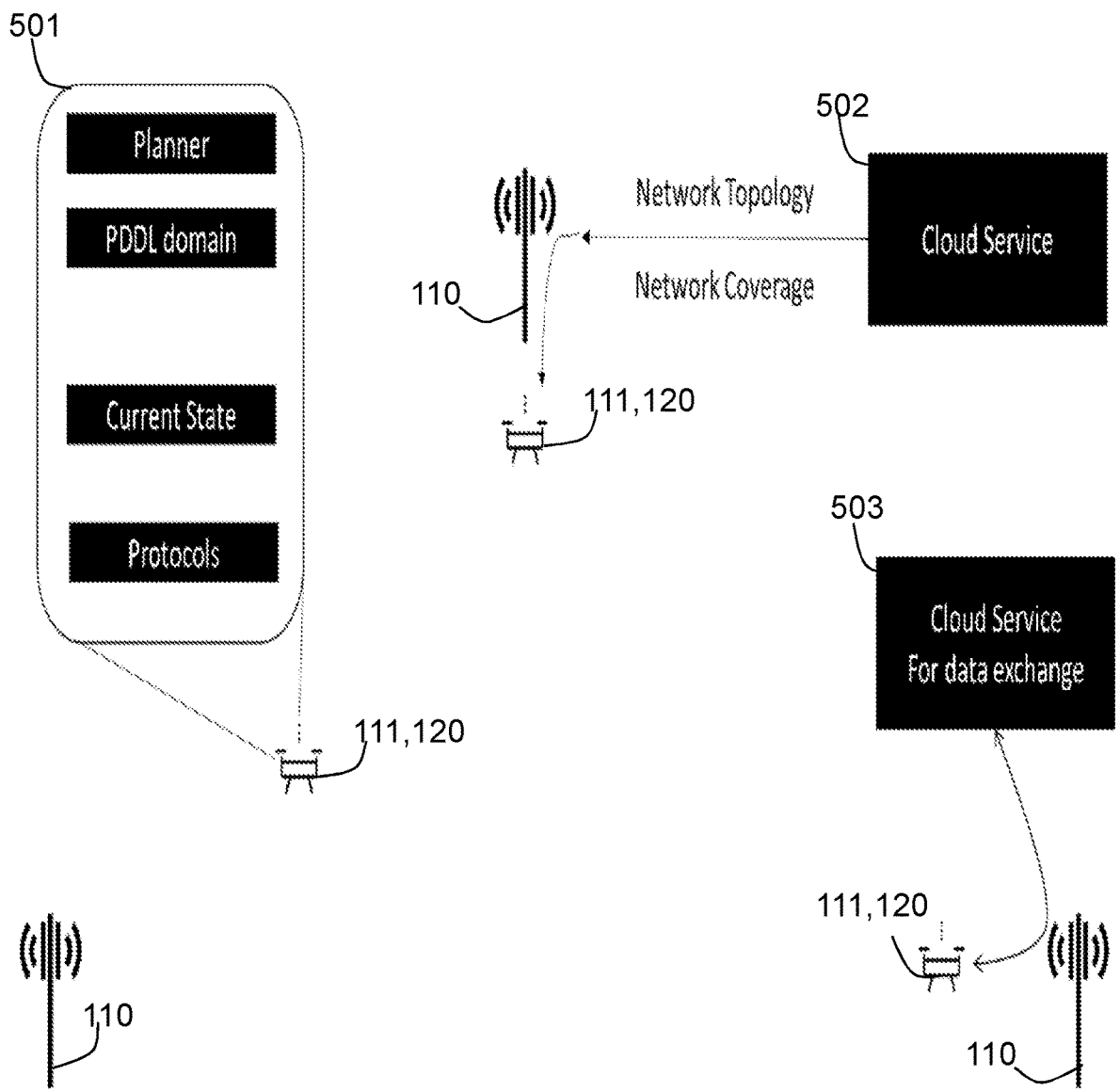
FIG. 5 is a schematic diagram of some aspects of methods in a first node and in a second node, according to embodiments herein.

FIG. 5 is a schematic diagram of some aspects of a collaboration among autonomous agents according to embodiments herein. As may be appreciated from the Figure, there may be three main components in embodiments herein: a) the knowledge base 501 in the each of the first node 111 and the one or more second nodes 120, which may be referred to herein as intelligent autonomous agents, or simply agents, as described above, b) cloud services for serving network information 502 and c) cloud services to facilitate data exchange 503. Assumed is the underlying network capability, both wide area and personal area, such as Bluetooth or LAN, and access to the cloud 125. Each of the first node 111 and the one or more second nodes 120, may comprise a planner, a PDDL domain, a set of protocols to carry out communications, and a current state. The current state may be understood to comprise the position, available battery power and memory of a node. The set of protocols may comprise: 1) protocols for radio based communication and connection to the cloud resources, and/or, 2) protocols for Local Area Network (LAN)/Personal Area Network (PAN) to discover and identify other agents in the vicinity and exchange knowledge.

Figure 6:
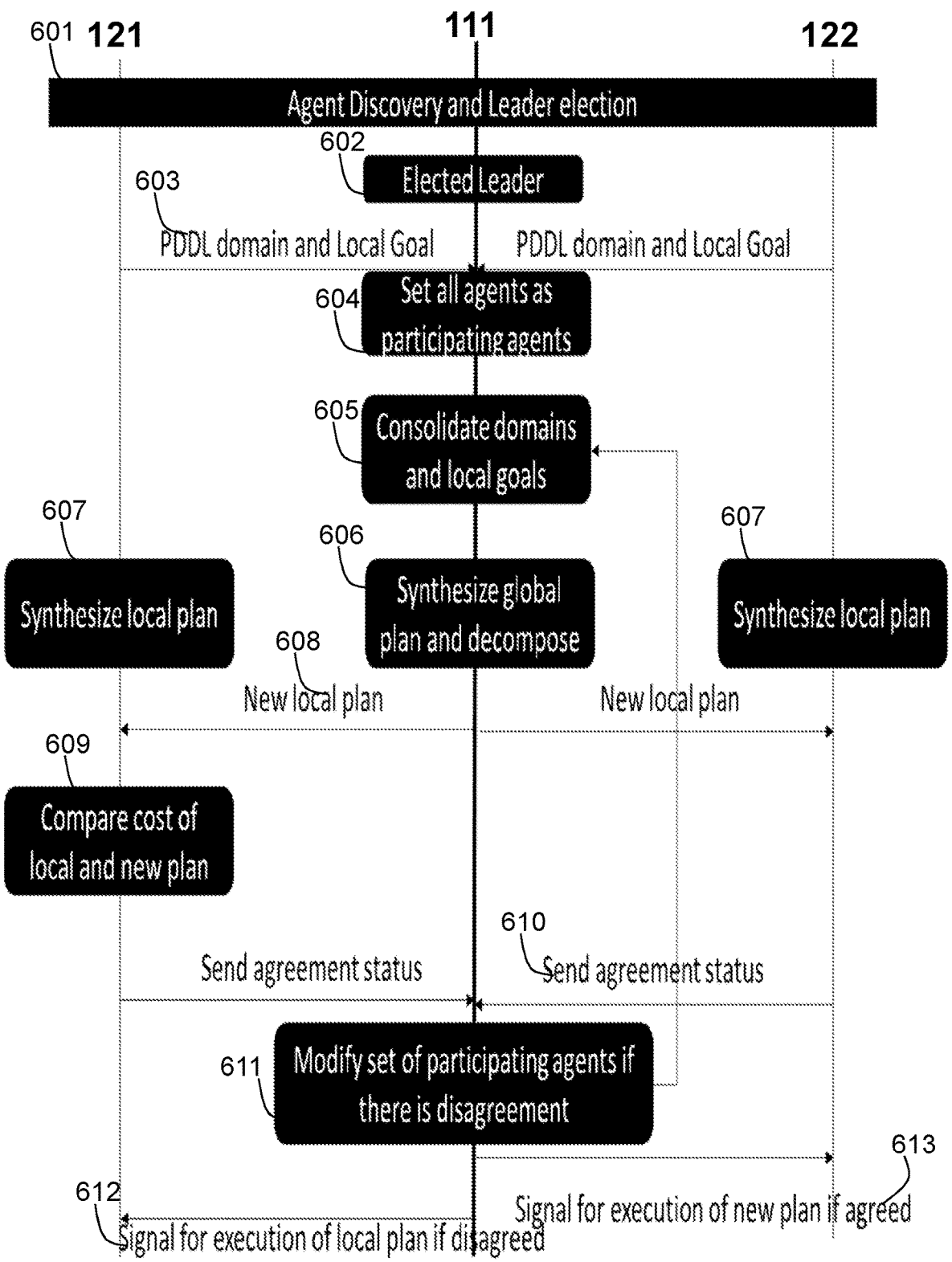
FIG. 6 is a signalling diagram illustrating an example of methods according to embodiments herein.

FIG. 6 is a schematic representation the actions and messages that may be exchanged between the first node 111 and the one or more second nodes 120, here comprising the second node 121, and the another second node 122, through an activity diagram of an non-limiting example of a protocol for collaborative plan synthesis procedure, according to embodiments herein. In this particular non-limiting example, the method is triggered at 601, by an agent discovering one or more of the other agents in its vicinity. At 602, the agents elect the first node 111 as a leader using a distributed leader election protocol. At 603, in accordance with Action 301, the agents supply their PDDL domains and goals to the leader agent. At 604, the leader agent sets all the agents as participating agents. At 605, the leader agent constructs, in agreement with Action 302, a single PDDL domain out of all the actions from the agents. Note that the "know" predicates, the actions "goto", "copy" and "transfer" are common to all the agents. At 605, the leader agent, also in agreement with Action 302, constructs a single goal by taking the union of all the goals from the agents, that is, all the local goals. At 606, the leader agent computes a plan, further in agreement with Action 302, using its planner. Simultaneously, at 607, each agent also computes their own local plans with their own domains. The leader agent decomposes the plan for each agent by projecting each action according to the agent parameter. At 608, the leader agent sends, in agreement with Action 303, the decomposed plans to respective agents, in the respective second indications. At 609, each agent annotates the actions as self-actions or proxy-actions by checking the dependency of its original goals and the actions in the plan. Each agent computes, in agreement with Action 403, the total plan cost and compare with the cost of the local plan. If the new plan has less cost, at 610, each of the agents sends, in agreement with Action 404, a consent to the leader, which is received in agreement with Action 304. Else, it sends a disagreement, which may be received in agreement with Action 304. If there is a disagreement, at 611, the leader notes the agreeing agents only and repeats step 605, in agreement with Action 305. At 612, the disagreeing agents, here exemplified for the second node 121, follow their own plans. At 613, the agreeing agents, here exemplified for the another second node 122, follow the new plans as suggested by the leader.

Figure 7:
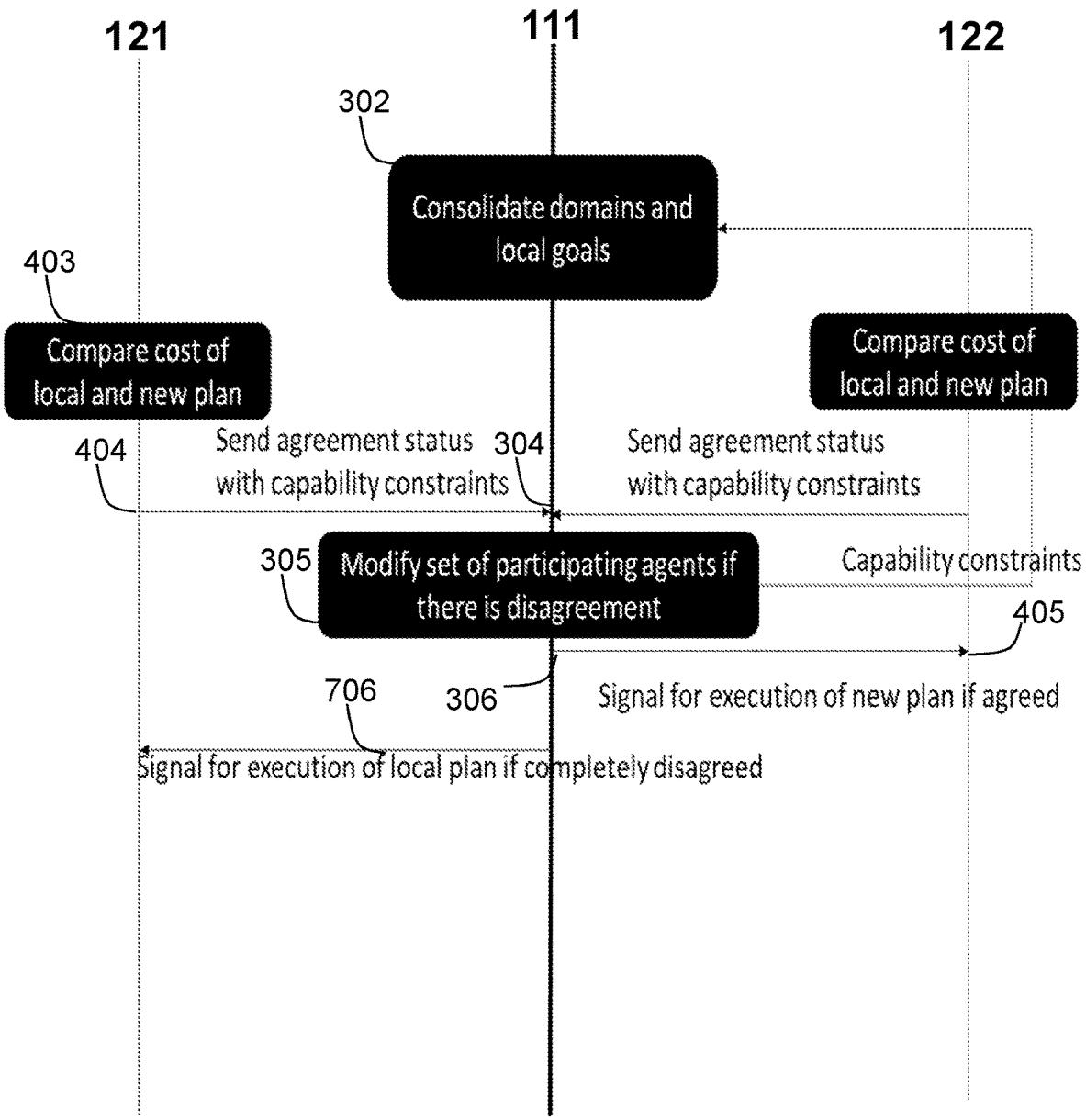
FIG. 7 is a signalling diagram illustrating an example of methods according to embodiments herein.

FIG. 7 is a schematic representation of a non-limiting example of a protocol for collaborative plan synthesis procedure when agents refuse proxy-actions, according to embodiments herein. In FIG. 7, the actions and messages that may be exchanged between the first node 111 and the one or more second nodes 120, here comprising the second node 121, and the another second node 122, are represented through an activity diagram. In agreement with Action 302, the leader agent, here the first node 111, constructs a single goal by taking the union of all the goals from the agents, that is, all the local goals. The leader agent then computes a plan, further in agreement with Action 302, using its planner, and sends the respective second indications to each of the second node 121 and the another second node 122, in accordance with Action 303. Simultaneously, at 702, each of the second node 121 and the another second node 122 also computes their own local plans with their own domains. Each agent computes the total plan cost and compares with the cost of the local plan. According to the first alternative discussed earlier, the disagreement by a second node of the respective plan indicated by the first node 111 in Action 303, may be only for a subset of proxy-actions, which may be indicated by each of the second node 121 and the another second node 122 in a respective third indication as an agreement status with capability constraints, that is, with any predefined policy or policies specifying whether a node may agree or disagree to perform an action. The respective third indications are then received by the first node 111 in agreement with Action 304. Then, in agreement with Action 305, the first node 111, may try to re-plan taking this into account. The first node 111 may then start over from Action 302. This may result in plans where the proxy-actions may be assigned to a different second node. In agreement with Action 306, the first node 111 signals to the agreeing agents, here exemplified for the another second node 122, to follow the new plans as suggested. At 706, the first node 111 signals to the completely disagreeing agents, here exemplified for the second node 121, to follow their own plans.

Figure 8:
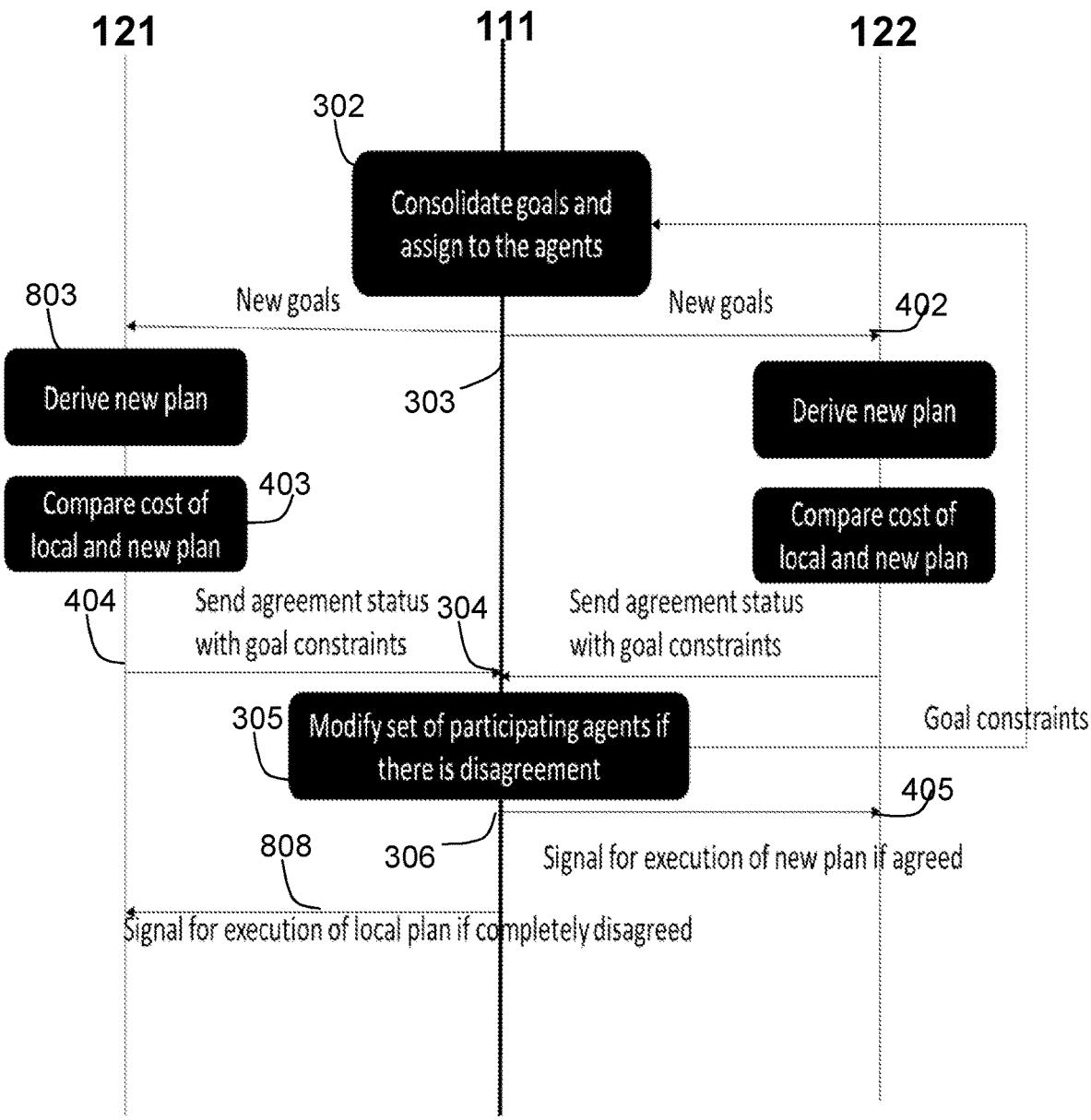
FIG. 8 is a signalling diagram illustrating an example of methods according to embodiments herein.

FIG. 8 is a schematic representation of a non-limiting example of a protocol for collaborative plan synthesis procedure with goal assignment and distributed plan synthesis, according to embodiments herein. In FIG. 8, the actions and messages that may be exchanged between the first node 111 and the one or more second nodes 120, here comprising the second node 121, and the another second node 122, are represented through an activity diagram. In agreement with Action 302, the leader agent, here the first node 111, constructs a single goal by taking the union of all the goals from the agents, that is, all the local goals. The leader agent then partitions and assigns the mission goals to any of the one or more second nodes 120, further in agreement with Action 302, using its planner, and sends the respective second indications to each of the second node 121 and the another second node 122, indicating the new goals to be achieved by each of them in agreement with Action 303. Simultaneously, at 803, each of the second node 121 and the another second node 122 also synthesize their respective plans locally. At 804, each agent may then annotate the actions as self-actions or proxy-actions by checking the dependency of its original goals and the actions in the plan, compute the total plan cost, and compare with the cost of the local plan. If the new plan has less cost, the second node 121 and the another second node 122 may each send a consent to the first node 111. The second nodes may disagree on the set of goals assigned to them, which may be indicated by each of the second node 121 and the another second node 122 in a respective third indication at 805 as an agreement status with goal constraints. The respective third indications are then received by the first node 111 in agreement with Action 304. In such a case the re-planning may start in agreement with Action 305, after the first node 111 may reassign the goals for the agreeing second nodes, based on the obtained goal constraints indicated by the second node 121 and the another second node 122. The first node 111 may then start over from Action 302. In agreement with Action 306, the first node 111 signals to the agreeing agents, here exemplified for the another second node 122, to follow the new plans as suggested. At 808, the first node 111 signals to the completely disagreeing agents, here exemplified for the second node 121, to follow their own plans.

Illustrative Example

Figure 9:
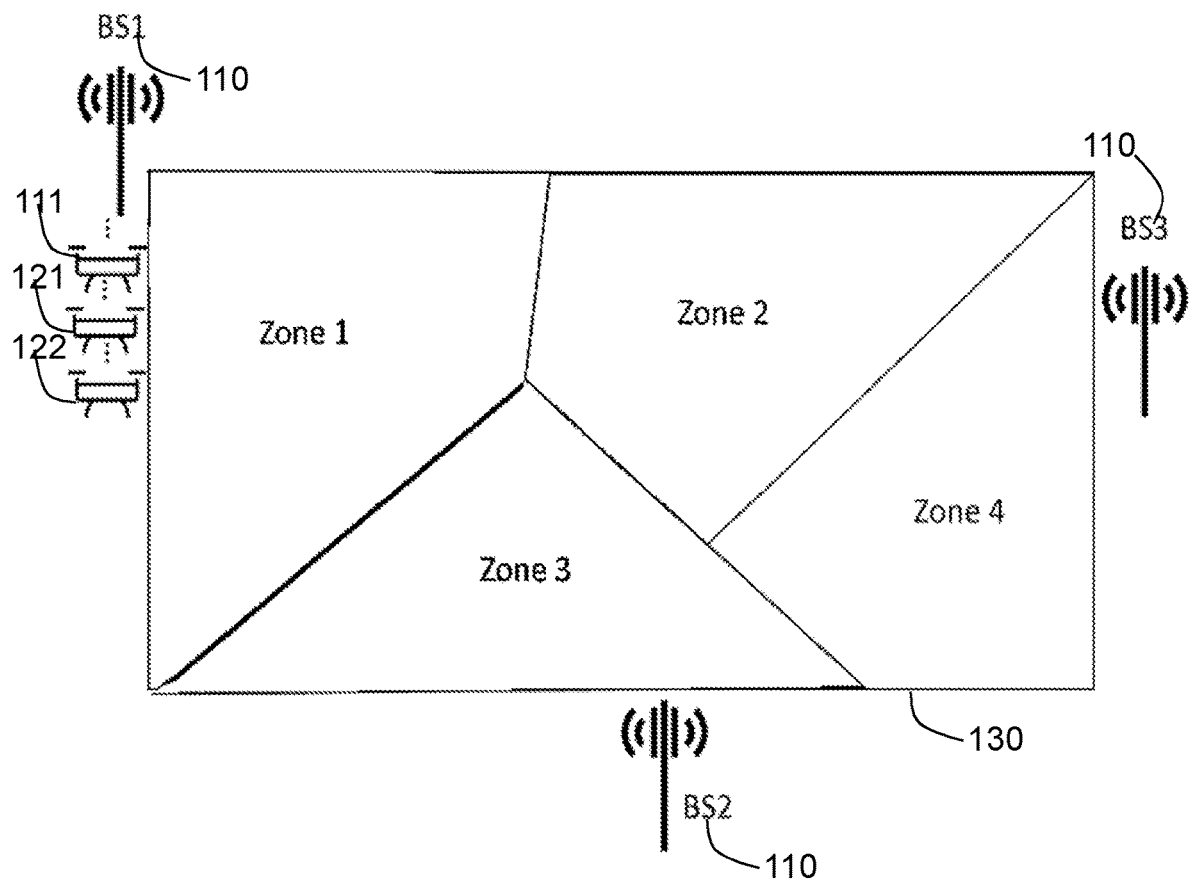
FIG. 9 is a schematic diagram illustrating an example of methods according to embodiments herein.

Embodiments herein will not be exemplified with a non-limiting illustrative example to establish opportunistic collaboration between autonomous agents such as the first node 111, the second node 121 and another second node 122. For this example, the scenario schematically represented in FIG. 9 will be used. In the scenario of FIG. 9, the one or more network nodes 110 in the wireless communications network 100 comprise three base stations: BS1, BS2 and BS3, which are positioned around the geographical area 130. The wireless communications network 100 also comprises the first node 111, and the one or more second nodes 120, which comprise the second node 121 and another second node 122. The geographical space 130 is a large rectangular geographical region with many zones. In this non-limiting example, the geographical space 130 is divided in four different zones: Zone 1, Zone 2, Zone 3 and Zone 4. For the purposes of this example, it is assumed that the large interior of the geographical space 130 does not have any coverage. Each of the first node 111, the second node 121 and another second node 122 are agents, respectively, Agent 1, Agent 2 and Agent 3, from three different operators with the following capabilities and missions.

| Agent | Capability(ies) | Mission(s) |
| --- | --- | --- |
| Agent 1 | camera (both high and low resolution) | Collect low resolution images of all the zones in the given region |
| Agent 2 | camera (both high and low resolution), soil quality detection | Soil quality measurement from zones with poor color crop |
| Agent 3 | soil quality detection, nutrient spray | Soil quality detection and nutrient spray in zones with low quality soil |

Agent 1, that is, the first node 111, may be able to achieve its mission by a plan which may generate an optimal path covering all the zones, a la Traveling Salesman problem solution, and taking low resolution photos for all the zones.

The goal of Agent 1 may be stated as:
(know Agent1 lowres-image1)
(know Agent1 lowres-image2)
(know Agent1 lowres-image3)
(know Agent1 lowres-image4)
A plan to achieve the goal Is:
(goto Agent1 start zone1)[3]
(takeImage Agent1 lowres zone1 lowres-image1)[2]
(goto Agent1 zone1 zone2)[3]
(takeImage Agent1 lowres zone2 lowres-image2)[2]
(goto Agent1 start zone3)[3]
(takeImage Agent1 lowres zone3 lowres-image3)[2]
(goto Agent1 start zone4)[3]
(takeImage Agent1 lowres zone1 lowres-image4)[2]
The total cost of the plan is 4×5=20 arbitrary units, e.g., km, m, etc. . . . . .

Agent 2, that is, the second node 121, may be able to achieve its mission by generating a zone covering path, taking high resolution photos of all the zones, deciding the poor color map through a classification, e.g., good or poor, model, and then collecting soil quality measurements from the zones with poor color map.

The goal of Agent 2 may be stated as:
(forall z:zones [implies (not (is-good (colormap z))) (know Agent2 z (soil-quality z))])

Agent 2 may be able to achieve this goal through the following plan:
(goto Agent2 start zone1)[3]
(takeImage Agent2 highres zone1 highres-image1)[2]
(process Agent2 highres-image1 soil-quality) [2]//produces a boolean condition B for soil-quality measurement
(measure-soil-quality Agent2 zone1) [2]//conditional effect: if B is true then take soil quality measurement of zone 1 else skip
:
Similarly for zones 2, 3 and 4
Total cost of the plans is 4×9=36

Agent 3, that is, the another second node 122, may achieve its mission by generating a zone covering path, collecting soil quality measurements, determining the zones where the quality is below certain level and spraying nutrients in those zones.

The goal of Agent 3 may be stated as:
(forall z:zones [implies (not (is-good (soil-quality z))) (spray Agent2 z)])

Agent 3 can achieve this goal through the following plan:
(goto Agent3 start zone1)[5]
(prepare Agent3 zone1 soil-quality)[2]
(measure-soil-quality Agent3 zone1) [2]
:
//Similarly for zones 2, 3 and 4//
(goto Agent3 zone4 start)[5]
The total cost is 4×9+5=41

It is assumed in this example that the Agents select Agent 1 as their leader. Agent 1 collects the capabilities and goals of Agents 2 and 3 according to Action 301, and then, according to Action 302, it builds the consolidated domains and problems. The generated plan decomposed for the Agents may be:
Agent1:
(goto Agent1 start zone1)[10]
(takeImage Agent1 lowres zone1 lowres-image1)[4]
(goto Agent1 zone1 zone2)[5]
(takeImage Agent1 lowres zone2 lowres-image2)[4]
(goto Agent1 start zone3)[5]
(takeImage Agent1 lowres zone3 lowres-image3)[4]
(takeImage Agent1 highres zone3 lowres-image3)[−6]
(goto Agent1 start zone4)[5]
(takeImage Agent1 lowres zone1 lowres-image4)[4]
(takeImage Agent1 highres zone3 lowres-image3)[−6]
(goto Agent1 zone4 BS4)[5]
(transfer cloud highres-image3)[1]
(transfer cloud highres-image4)[1]
(goto Agent1 BS4 start)[5] II going back to the start point
Original cost: 46, New cost: 41
Agent2:
(goto Agent2 start zone1)[10]
(takeImage Agent2 highres zone1 highres-image1)[4−6=−2]
(process Agent2 highres-image1 soil-quality) [2]
(measure-soil-quality Agent2 zone1 soil-quality1) [4]
(goto Agent2 zone1 zone2)[5]
(takeImage Agent2 highres zone2 highres-image2)[4-6=−2]
(process Agent2 highres-image2 soil-quality) [2]
(measure-soil-quality Agent2 zone2 soil-quality2) [4]
(goto Agent2 zone2 BS2)[5]
(get Agent2 cloud highres-image3)[1]
(get Agent2 cloud highres-image4)[1]
(transfer Agent2 Agent3 soil-quality1)[1]
(transfer Agent2 Agent3 soil-quality2)[1]
(process Agent2 highres-image3 soil-quality) [2]
(goto Agent2 zone3)[5]
(measure-soil-quality Agent2 zone1) [4]
(process Agent2 highres-image4 soil-quality) [2]
(goto Agent2 zone4)[5]
(measure-soil-quality Agent2 zone4) [4]
(goto Agent2 zone4 start)[5]
Original cost: 70, new cost: 59. In fact, if the processing results in good soil quality, the movement to zones 3 and 4 may be completely avoided, and hence much more cost may be saved.

Agent 2 may use the high resolution images taken by Agent 1. Note that these are extra, or proxy actions carried out by Agent 1 towards the collaborative plan. In order to get this information, Agents 1 and 2 have to move to a coverage area, e.g., by asynchronous movements, and exchange information via the cloud service. Agents may be understood to not need to reach a point at the same time. One may reach a coverage area and upload to the cloud 125, while another agent may go to another coverage area at some other time to access the artifact from the cloud 125. However, the overall cost is reduced.

Agent3:
    (goto Agent3 start zone3)[10]
    (prepare Agent3 zone3 soil-quality)[2]
    (measure-soil-quality Agent3 zone3 soil-quality3) [2]
    (goto Agent3 zone3 zone4)[5]
    (prepare Agent3 zone4 soil-quality)[2]
    (measure-soil-quality Agent3 zone4 soil-quality4) [2]
    (goto Agent3 zone4 BS2)[5]
    (get Agent3 Agent2 soil-quality1)[1]
    (get Agent3 Agent2 soil-quality2)[1]
    (goto Agent3 BS2 start)[5]
    Original cost: 41, new cost: 35

Agent 3 may reuse the soil-quality measurements of Agent 2. There is an extra movement and data transfer costs, e.g., synchronous exchange of information where the Agents come to a common point, but there is also saving in earlier movements and measurement costs.

Since the new costs are less than the original costs, the Agents agree on the new plans and execute them, achieving their respective mission goals at lesser cost.

To summarize some aspects of the foregoing, embodiments herein may involve the following elements: 1) representation of and reasoning with the knowledge of capabilities of agents in the vicinity, 2) exchange of required and provided timed-predicates, 3) replanning using required and provided timed-predicates, thus helping in derivation of plans with cooperative actions, 4) new action items in the plan facilitating the exchange of information that may be necessary because of task delegation to other agents, 5) optimization of the extra mobilities that may be necessary for information exchange using the edge and the knowledge of the network topology, 6) addition of new capabilities from the cloud, to copy/transfer information artifacts, to overcome memory limits and also to reduce cost by helping in information exchange, and 7) exploiting the network and cloud characteristics to optimize collaboration.

One advantage of embodiments herein is that the intelligent autonomous agents may be able to optimize their tasks, and hence mission cost, opportunistically through the cooperation with agents in the vicinity. The mission cost may include operation time and energy consumption. The edge may help in the cooperative plan execution by providing a logical rendezvous point and scope for mobility optimization. For example, one agent may be able to transfer knowledge at a node and the other agent may acquire that knowledge at another node. The proposed collaboration methodology may establish robust communication, efficient data management, and effective sharing of information between autonomous agents involved in the mission.

Figure 10:
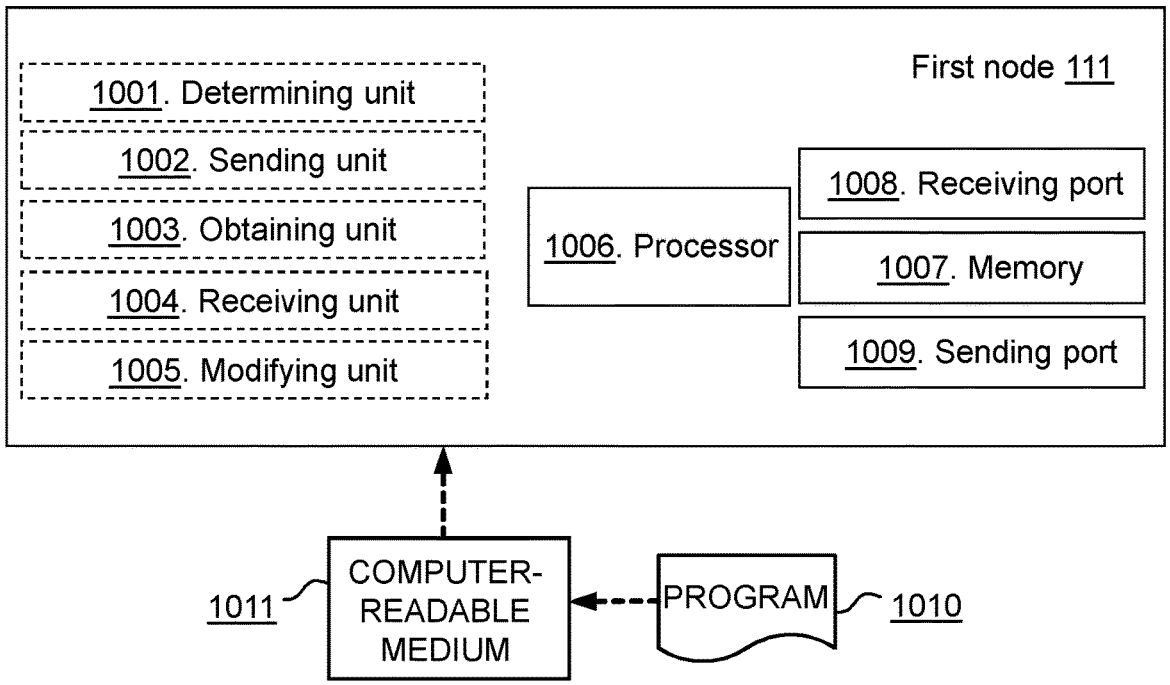
FIG. 10 is a schematic block diagram illustrating two non-limiting examples, a) and b), of a first node, according to embodiments herein.
Figure 10:
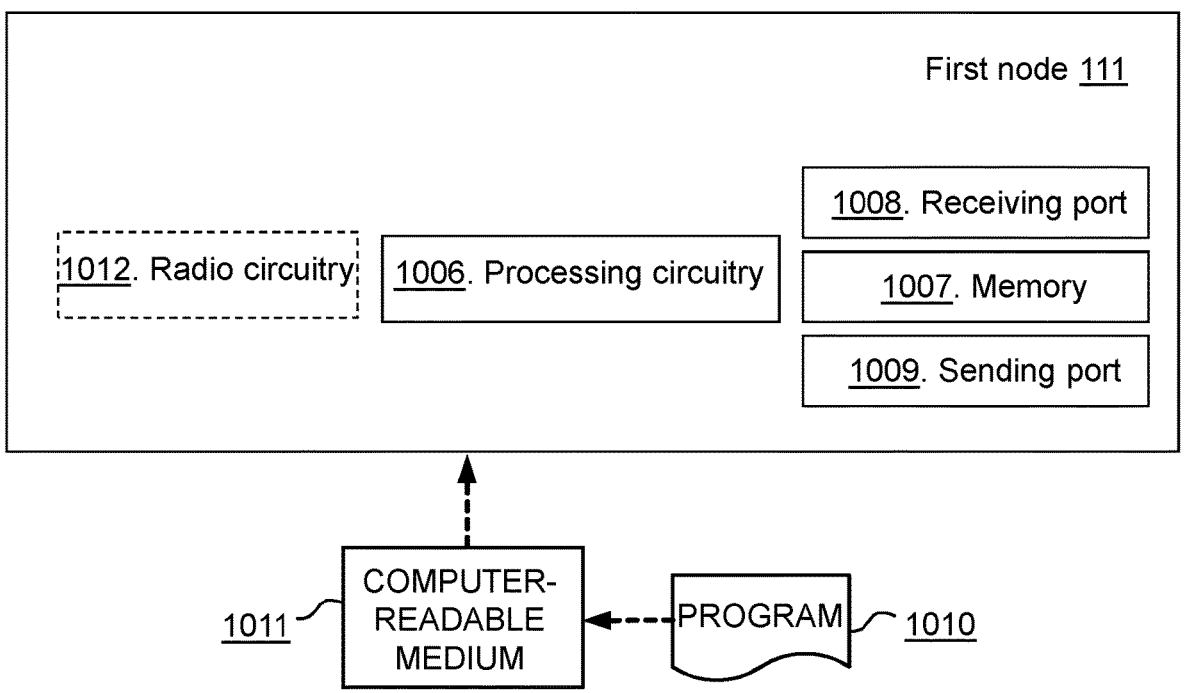

FIG. 10 depicts two different examples in panels a) and b), respectively, of the arrangement that the first node 111 may comprise. In some embodiments, the first node 111 may comprise the following arrangement depicted in FIG. 10a. The first node 111 may be understood to be for achieving the set of goals in the geographical space 130. The first node 111 may be configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 10, optional units are indicated with dashed boxes.

The detailed description of some of the following corresponds to the same references provided above, in relation to the actions described for the first node 111, and will thus not be repeated here. For example, in some examples, each of the first node 111 and the one or more second nodes 120 may be Intelligent Autonomous Systems.

The first node 111 is configured to perform the determining of Action 302, e.g., by means of a determining unit 1001 within the first node 111, configured to determine the plan, based on: i) the first goal of the first node 111 to be achieved in the geographical space 130 according to a first set of capabilities of the first node 111, and the first set of first actions to be individually performed by the first node 111 to achieve the first goal, and ii) for each second node of one or more second nodes 120 within radio coverage of the first node 111: a) the respective goal to be achieved in the geographical space 130 according to the respective set of capabilities of each second node of the one or more second nodes 120, and b) the respective set of first actions to be individually performed by each second node of the one or more second nodes 120 to achieve the respective goal. The plan is to collaboratively achieve each of the respective goals and the first goal in the geographical space 130, by determining the respective set of second actions to be respectively performed by each second node of the one or more second nodes 120 and the first node 111.

The first node 111 is further configured to perform the sending of Action 303, e.g., by means of a sending unit 1002 within the first node 111, configured to send, to each second node of the one or more second nodes 120, the respective indication. The respective indication is configured to indicate the respective set of second actions configured to be determined.

In some embodiments, to determine may be configured to be based on the first cost of the respective sets of first actions and the second cost of the respective sets of second actions.

The first node 111 may be further configured to perform the obtaining of Action 301, e.g., by means of an obtaining unit 1003 within the first node 111, configured to obtain, respectively from each second node of the one or more second nodes 120, the one or more respective first indications. Each of the one or more respective first indications may be configured to indicate, respectively, for each second node of the one or more second nodes 120: a) the respective goal, b) the respective set of capabilities, and c) the respective set of first actions. The plan configured to be determined may be configured to be based on the one or more respective first indications configured to be obtained.

In some embodiments, each of the one or more respective first indications may be the file with the PDDL format, and to determine the plan may be configured to comprise constructing the single file with PDDL format comprising all the first actions.

In some embodiments, the respective indication may be the respective second indication. In some of such embodiments, the first node 111 may be further configured to perform the receiving of Action 304, e.g., by means of a receiving unit 1004 within the first node 111, configured to receive, respectively from each second node of the one or more second nodes 120, the one or more respective third indications. Each of the one or more respective third indications may be configured to indicate, respectively, for each second node of the one or more second nodes 120 the consent or the disagreement to perform the respective set of second actions.

In some embodiments, at least one of the respective third indications may be configured to indicate a disagreement to perform the respective set of second actions. In some of such embodiments, the first node 111 may be further configured to perform the modifying of Action 305, e.g., by means of a modifying unit 1005 within the first node 111, configured to modify the plan configured to be determined according to the one or more respective third indications configured to be received. To modify may be configured to be performed, by at least one of: i) excluding any of the one or more second nodes 120 having indicated a disagreement to perform the respective set of second actions, and ii) assigning the second actions that any of the one or more second nodes 120 have disagreed to perform to other second nodes of the one or more second nodes 120.

In some embodiments, the first node 111 may be further configured to perform the sending of Action 306, e.g., by means of the sending unit 1002 within the first node 111, configured to send, to each second node of the one or more second nodes 120 having indicated a consent to perform at least one of the respective set of second actions, the respective fourth indication. The respective fourth indication may be configured to indicate the respective set of third actions to be performed according to the modified plan.

In some embodiments, the first node 111 may be further configured to perform the receiving of Action 307, e.g., by means of the receiving unit 1004 within the first node 111, configured to receive the at least one fifth indication from any of the one or more second nodes 120. The fifth indication may be configured to indicate a failure in the execution of any of the plan and the modified plan.

In some embodiments, the first node 111 may be further configured to perform the modifying of Action 308, e.g., by means of the modifying unit 1005 within the first node 111, configured to modify any of the determined plan and the modified plan according to the fifth indication configured to be received.

In some embodiments, the first node 111 may be further configured to perform the sending of Action 309, e.g., by means of the sending unit 1002 within the first node 111, configured to send, to each second node of the one or more second nodes 120 having indicated a consent to perform at least one of the respective set of second actions, the respective sixth indication. The respective sixth indication may be configured to indicate the respective set of fourth actions to be performed according to the modified original determined plan or the remodified plan.

In some embodiments, each of the first node 111 and the one or more second nodes 120 may be configured to be Intelligent Autonomous Systems, and to determine may be configured to be based upon the first node 111 being chosen the leader of the one or more second nodes 120.

In some embodiments, the actions may be configured to comprise at least one of; self-actions, proxy-actions, goto actions, and transfer actions.

The embodiments herein in the first node 111 may be implemented through one or more processors, such as a processor 1006 in the first node 111 depicted in FIG. 10a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 1007 comprising one or more memory units. The memory 1007 is arranged to be used to store obtained information, store data, configurations, schedulings, and applications etc. to perform the methods herein when being executed in the first node 111.

In some embodiments, the first node 111 may receive information from, e.g., the second node 121, the another second node 122, the further second node 123, any other nodes in the one or more second nodes 120, any of the one or more network nodes 110 and/or any node in the cloud 125, through a receiving port 1008. In some embodiments, the receiving port 1008 may be, for example, connected to one or more antennas in first node 111. In other embodiments, the first node 111 may receive information from another structure in the wireless communications network 100 through the receiving port 1008. Since the receiving port 1008 may be in communication with the processor 1006, the receiving port 1008 may then send the received information to the processor 1006. The receiving port 1008 may also be configured to receive other information.

The processor 1006 in the first node 111 may be further configured to transmit or send information to e.g., the second node 121, the another second node 122, the further second node 123, any other nodes in the one or more second nodes 120, any of the one or more network nodes 110, any node in the cloud 125, and/or or another structure in the wireless communications network 100, through a sending port 1009, which may be in communication with the processor 1006, and the memory 1007.

Those skilled in the art will also appreciate that the units 1001-1005 described above may refer to a combination of analog and digital circuits, and/or one or more processors configured with software and/or firmware, e.g., stored in memory, that, when executed by the one or more processors such as the processor 1006, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1001-1005 described above may be implemented as one or more applications running on one or more processors such as the processor 1006.

Thus, the methods according to the embodiments described herein for the first node 111 may be respectively implemented by means of a computer program 1010 product, comprising instructions, i.e., software code portions, which, when executed on at least one processor 1006, cause the at least one processor 1006 to carry out the actions described herein, as performed by the first node 111. The computer program 1010 product may be stored on a computer-readable storage medium 1011. The computer-readable storage medium 1011, having stored thereon the computer program 1010, may comprise instructions which, when executed on at least one processor 1006, cause the at least one processor 1006 to carry out the actions described herein, as performed by the first node 111. In some embodiments, the computer-readable storage medium 1011 may be a non-transitory computer-readable storage medium, such as a CD ROM disc, or a memory stick. In other embodiments, the computer program 1010 product may be stored on a carrier containing the computer program 1010 just described, wherein the carrier is one of an electronic signal, optical signal, radio signal, or the computer-readable storage medium 1011, as described above.

The first node 111 may comprise a communication interface configured to facilitate, or an interface unit to facilitate, communications between the first node 111 and other nodes or devices, e.g., the second node 121, the another second node 122, the further second node 123, any other nodes in the one or more second nodes 120, any of the one or more network nodes 110, any node in the cloud 125, and/or or another structure. The interface may, for example, include a transceiver configured to transmit and receive radio signals over an air interface in accordance with a suitable standard.

In other embodiments, the first node 111 may comprise the following arrangement depicted in FIG. 10b. The first node 111 may comprise a processing circuitry 1006, e.g., one or more processors such as the processor 1006, in the first node 111 and the memory 1007. The first node 111 may also comprise a radio circuitry 1012, which may comprise e.g., the receiving port 1008 and the sending port 1009. The processing circuitry 1006 may be configured to, or operable to, perform the method actions according to FIG. 3, and/or FIGS. 5-9, in a similar manner as that described in relation to FIG. 10a. The radio circuitry 1012 may be configured to set up and maintain at least a wireless connection with the second node 121, the another second node 122, the further second node 123, any other nodes in the one or more second nodes 120, any of the one or more network nodes 110 and/or any node in the cloud 125. Circuitry may be understood herein as a hardware component.

Hence, embodiments herein also relate to the first node 111 operative to operate in the wireless communications network 100. The first node 111 may comprise the processing circuitry 1006 and the memory 1007, said memory 1007 containing instructions executable by said processing circuitry 1006, whereby the first node 111 is further operative to perform the actions described herein in relation to the first node 111, e.g., in FIG. 3, and/or FIGS. 5-9.

Figure 11:
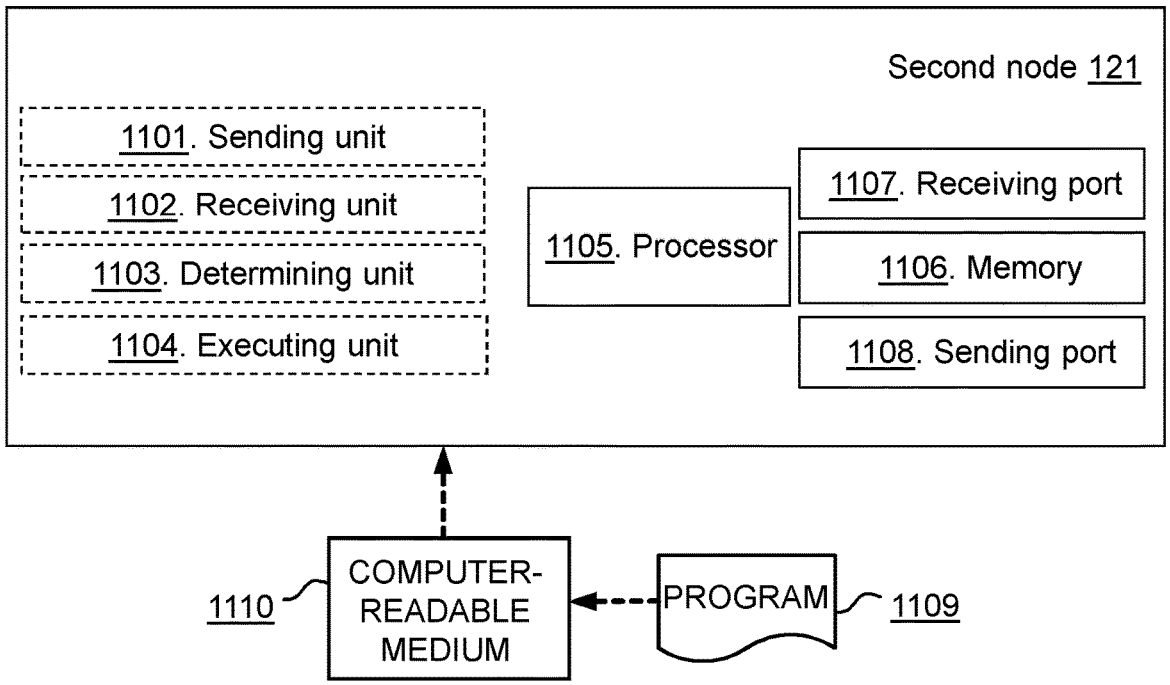
FIG. 11 is a schematic block diagram illustrating two non-limiting examples, a) and b), of a second node, according to embodiments herein.
Figure 11:
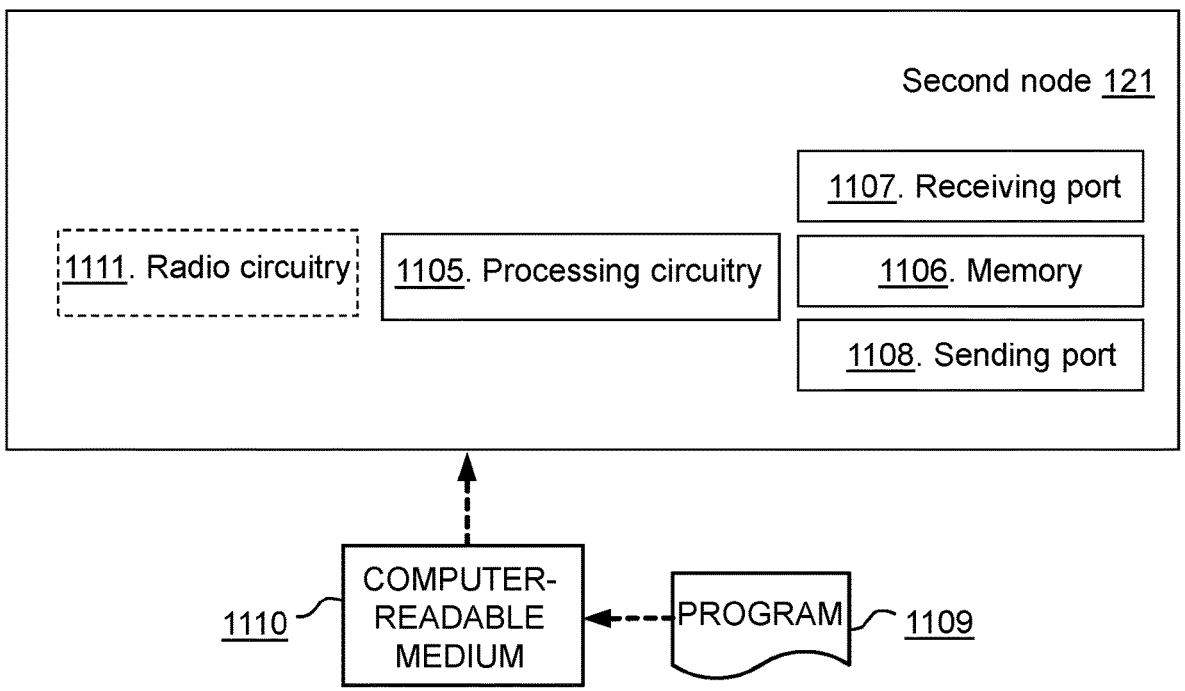

FIG. 11 depicts two different examples in panels a) and b), respectively, of the arrangement that the second node 121, may comprise. In some embodiments, the second node 121 may comprise the following arrangement depicted in FIG. 11a. The second node 121 may be understood to be for achieving the set of goals in the geographical space 130. The second node 121 is configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 11, optional units are indicated with dashed boxes.

The detailed description of some of the following corresponds to the same references provided above, in relation to the actions described for the second node 121, and will thus not be repeated here. For example, in some examples, each of the first node 111 and the one or more second nodes 120 may be Intelligent Autonomous Systems.

The second node 121 is configured to perform the sending of Action 401, e.g. by means of a sending unit 1101 within the second node 121, configured to, send the respective first indication to the first node 111 configured to operate in the wireless communications network 100. The respective first indication is configured to indicate: a) the respective goal of the second node 121 to be achieved in the geographical space 130 according to the respective set of capabilities of the second node 121, b) the respective set of capabilities of the second node 121, and c) the respective set of first actions to be individually performed by the second node 121 to achieve the respective goal.

The second node 121 is configured to perform the receiving of Action 402, e.g., by means of a receiving unit 1102 within the second node 121, configured to, receive, from the first node 111, the respective second indication. The respective second indication is configured to indicate the set of second actions to be individually performed by the second node 121. To receive the respective second indication is configured to be based on the respective first indication configured to be sent. The respective second indication configured to be received is configured to be based on the plan to collaboratively achieve by the first node 111 and one or more second nodes 120 within radio coverage of the first node 111: i) the first goal of the first node 111 to be achieved in the geographical space 130 according to the first set of capabilities of the first node 111, and ii) the respective goal to be achieved in the geographical space 130 by each of one or more second nodes 120 according to the respective set of capabilities of each second node of the one or more second nodes 120. The plan is configured to be based on the respective set of second actions to be respectively performed by each second node of the one or more second nodes 120 and the first node 111.

In some embodiments, the respective first indication may be configured to be a file with the PDDL format.

In some embodiments, the second node 121 may be further configured to perform the determining of Action 403, e.g., by means of a determining unit 1103 within the second node 121, configured to, determine whether or not to consent or disagree to perform the respective set of second actions based on the respective first cost of the respective set of first actions and the respective second cost of the respective set of second actions.

In some embodiments, the second node 121 may be further configured to perform the sending of Action 404, e.g., by means of the sending unit 1101 within the second node 121, configured to, send the respective third indication to the first node 111. The respective third indication may be configured to indicate the consent or disagreement to perform the respective set of second actions configured to be determined.

In some embodiments, the second node 121 may be further configured to perform the receiving of Action 405, e.g., by means of the receiving unit 1102 within the second node 121, configured to, receive the respective fourth indication from the first node 111. The respective fourth indication may be configured to indicate the respective set of third actions to be performed according to the plan. The plan may be configured to be modified based on at least one of: i) at least one of the one or more second nodes 120 having indicated a disagreement to perform the respective set of second actions, and ii) at least one of the one or more second nodes 120 having disagreed to perform at least one of the respective set of second actions.

In some embodiments, the second node 121 may be further configured to perform the sending of Action 406, e.g., by means of the sending unit 1101 within the second node 121, configured to, send the fifth indication to the first node 111. The fifth indication may be configured to indicate a failure in the execution of any of the respective set of first actions or the respective set of second actions.

In some embodiments, the second node 121 may be further configured to perform the receiving of Action 407, e.g., by means of the receiving unit 1102 within the second node 121, configured to, receive, from the first node 111 the respective sixth indication. The respective sixth indication may be configured to indicate the respective set of fourth actions to be performed according to the modified original determined plan or the remodified plan.

In some embodiments, the second node 121 may be further configured to perform the executing of Action 408, e.g., by means of an executing unit 1104 within the second node 121, configured to, execute one or more actions of the respective set of second actions, the respective set of third actions, and the respective set of fourth actions.

In some embodiments, each of the first node 111 and the one or more second nodes 120 may be configured to be Intelligent Autonomous Systems. In some of such embodiments, to receive the respective second indication may be configured to be based upon the first node 111 being chosen the leader of the one or more second nodes 120.

In some embodiments, the actions may be further configured to comprise at least one of: self-actions, proxy-actions, goto actions, and transfer actions.

The embodiments herein in the second node 121 may be implemented through one or more processors, such as a processor 1105 in the second node 121 depicted in FIG. 11a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 121. One such carrier may be in the form of a CD ROM disc. It is however feasible with other data carriers such as a memory stick. The computer program code may furthermore be provided as pure program code on a server and downloaded to the second node 121.

The second node 121 may further comprise a memory 1106 comprising one or more memory units. The memory 1106 is arranged to be used to store obtained information, store data, configurations, schedulings, and applications etc. to perform the methods herein when being executed in the second node 121.

In some embodiments, the second node 121 may receive information from, e.g., the first node 111, the another second node 122, the further second node 123, any other nodes in the one or more second nodes 120, any of the one or more network nodes 110 and/or any node in the cloud 125, through a receiving port 1107. In some embodiments, the receiving port 1107 may be, for example, connected to one or more antennas in second node 121. In other embodiments, the second node 121 may receive information from another structure in the wireless communications network 100 through the receiving port 1107. Since the receiving port 1107 may be in communication with the processor 1105, the receiving port 1107 may then send the received information to the processor 1105. The receiving port 1107 may also be configured to receive other information.

The processor 1105 in the second node 121 may be further configured to transmit or send information to e.g., the first node 111, the another second node 122, the further second node 123, any other nodes in the one or more second nodes 120, any of the one or more network nodes 110, any node in the cloud 125, and/or another structure in the wireless communications network 100, through a sending port 1108, which may be in communication with the processor 1105, and the memory 1106.

Those skilled in the art will also appreciate that the units 1101-1104 described above may refer to a combination of analog and digital circuits, and/or one or more processors configured with software and/or firmware, e.g., stored in memory, that, when executed by the one or more processors such as the processor 1105, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1101-1104 described above may be implemented as one or more applications running on one or more processors such as the processor 1105.

Thus, the methods according to the embodiments described herein for the second node 121 may be respectively implemented by means of a computer program 1109 product, comprising instructions, i.e., software code portions, which, when executed on at least one processor 1105, cause the at least one processor 1105 to carry out the actions described herein, as performed by the second node 121. The computer program 1109 product may be stored on a computer-readable storage medium 1110. The computer-readable storage medium 1110, having stored thereon the computer program 1109, may comprise instructions which, when executed on at least one processor 1105, cause the at least one processor 1105 to carry out the actions described herein, as performed by the second node 121. In some embodiments, the computer-readable storage medium 1110 may be a non-transitory computer-readable storage medium, such as a CD ROM disc, or a memory stick. In other embodiments, the computer program 1109 product may be stored on a carrier containing the computer program 1109 just described, wherein the carrier is one of an electronic signal, optical signal, radio signal, or the computer-readable storage medium 1110, as described above.

The second node 121 may comprise a communication interface configured to facilitate, or an interface unit to facilitate, communications between the second node 121 and other nodes or devices, e.g., the first node 111, the another second node 122, the further second node 123, any other nodes in the one or more second nodes 120, any of the one or more network nodes 110, any node in the cloud 125, and/or another structure in the wireless communications network 100. The interface may, for example, include a transceiver configured to transmit and receive radio signals over an air interface in accordance with a suitable standard.

In other embodiments, the second node 121 may comprise the following arrangement depicted in FIG. 11b. The second node 121 may comprise a processing circuitry 1105, e.g., one or more processors such as the processor 1105, in the second node 121 and the memory 1106. The second node 121 may also comprise a radio circuitry 1111, which may comprise e.g., the receiving port 1107 and the sending port 1108. The processing circuitry 1105 may be configured to, or operable to, perform the method actions according to FIG. 4 and/or FIGS. 5-9, in a similar manner as that described in relation to FIG. 11a. The radio circuitry 1111 may be configured to set up and maintain at least a wireless connection with the first node 111, the another second node 122, the further second node 123, any other nodes in the one or more second nodes 120, any of the one or more network nodes 110, any node in the cloud 125, and/or another structure. Circuitry may be understood herein as a hardware component.

Hence, embodiments herein also relate to the second node 121 operative to operate in the wireless communications network 100. The second node 121 may comprise the processing circuitry 1105 and the memory 1106, said memory 1106 containing instructions executable by said processing circuitry 1105, whereby the second node 121 is further operative to perform the actions described herein in relation to the second node 121, e.g., in FIG. 4, and/or FIG. 5-9.

Figure 12:
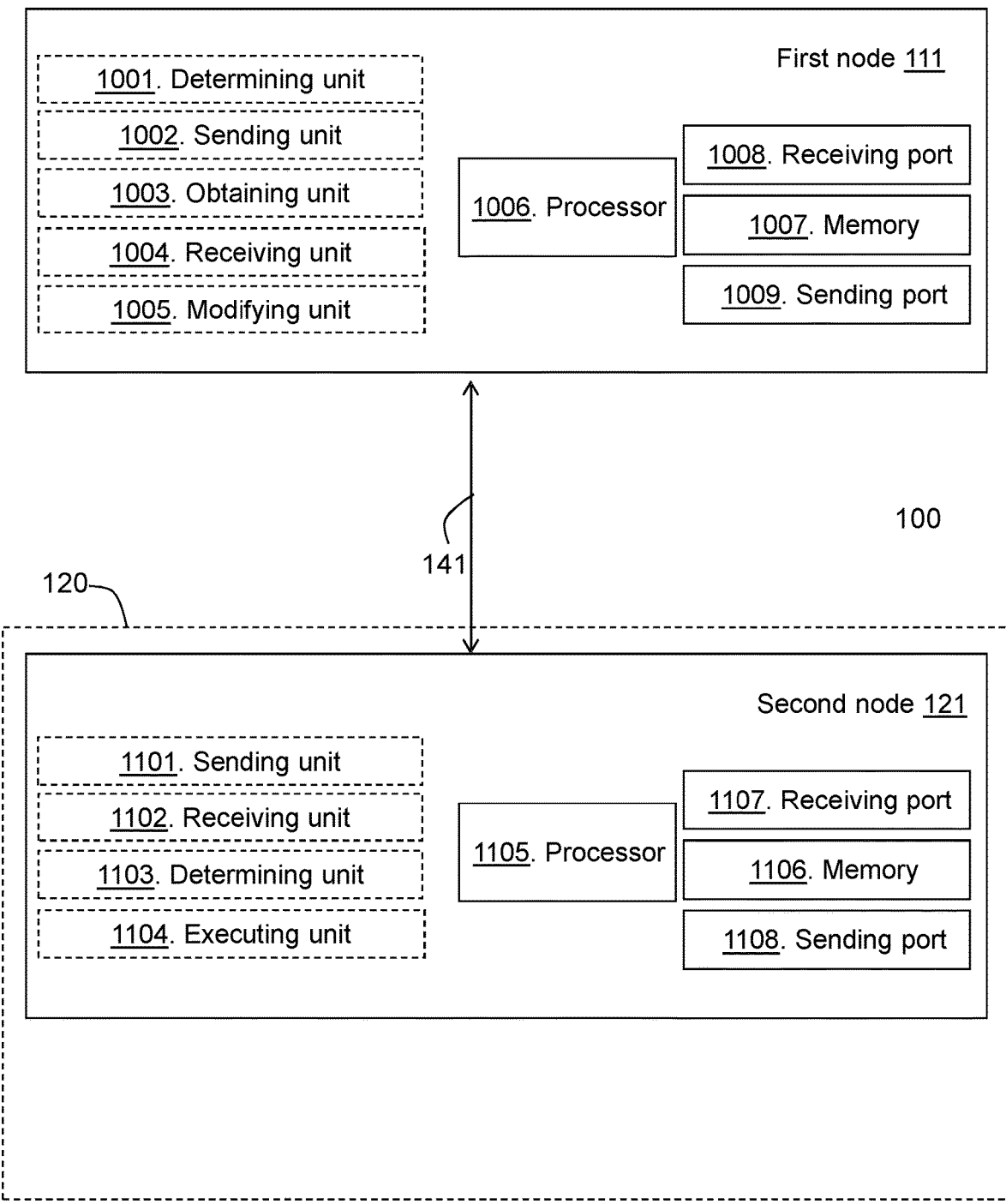
FIG. 12 is a schematic block diagram illustrating a non-limiting example of a wireless communications network, according to embodiments herein.

FIG. 12 depicts an example of the arrangement that the wireless communications network 100 may comprise. In embodiments herein the wireless communications network 100 is configured to enable communication between the first node 111 and the one or more second nodes 120 comprising the second node 121 for achieving a set of goals in a geographical space 130. In such embodiments, the second node 121 is configured to send the respective first indication to the first node 111. The respective first indication is configured to indicate: i) the respective goal of the second node 121 to be achieved in the geographical space 130 according to the respective set of capabilities of the second node 121, ii) the respective set of capabilities of the second node 121, and iii) the respective set of first actions to be individually performed by the second node 121 to achieve the respective goal. In such embodiments, the first node 111 is configured to determine the plan, based on: i) the first goal of the first node 111 to be achieved in the geographical space 130 according to the first set of capabilities of the first node 111, and the first set of first actions to be individually performed by the first node 111 to achieve the first goal, and ii) for each second node of the one or more second nodes 120 within radio coverage of the first node 111: a) the respective goal to be achieved in the geographical space 130 according to the respective set of capabilities of each second node of the one or more second nodes 120, and b) the respective set of first actions to be individually performed by each second node of the one or more second nodes 120 to achieve the respective goal. The plan is to collaboratively achieve each of the respective goals and the first goal in the geographical space 130, by determining the respective set of second actions to be respectively performed by each second node of the one or more second nodes 120 and the first node 111. The first node 111 is also configured to send, to each second node of the one or more second nodes 120, the respective indication. The respective indication is configured to indicate the respective set of second actions configured to be determined. In such embodiments, the second node 121 is further configured to: receive, from the first node 111, the respective second indication. The respective second indication is configured to indicate the set of second actions to be individually performed by the second node 121.

In some embodiments of the wireless communications network 100, the first node 111 may be further configured to determine based on the first cost of the respective sets of first actions and the second cost of the respective sets of second actions.

In some embodiments of the wireless communications network 100, the first node 111 may be further configured to: obtain, respectively from each second node of the one or more second nodes 120, the one or more respective first indications, each of the one or more respective first indications being configured to indicate, respectively, for each second node of the one or more second nodes 120: a) the respective goal, b) the respective set of capabilities, and c) the respective set of first actions. In such embodiments, the plan configured to be determined may be configured to be based on the one or more respective first indications configured to be obtained.

In some embodiments of the wireless communications network 100, each of the one or more respective first indications may be a file with the PDDL format, and to determine the plan may be configured to comprise constructing the single file with PDDL format comprising all the first actions.

In some embodiments of the wireless communications network 100, the respective indication may be the respective second indication, and the first node 111 may be further configured to: receive, respectively from each second node of the one or more second nodes 120, the one or more respective third indications. Each of the one or more respective third indications may be configured to indicate, respectively, for each second node of the one or more second nodes 120 the consent or the disagreement to perform the respective set of second actions.

In some embodiments of the wireless communications network 100, at least one of the respective third indications may be configured to indicate the disagreement to perform the respective set of second actions, and the first node 111 may be further configured to modify the plan configured to be determined according to the one or more respective third indications configured to be received. This may be configured to be performed, by at least one of: i) excluding any of the one or more second nodes 120 having indicated a disagreement to perform the respective set of second actions, and ii) assigning the second actions that any of the one or more second nodes 120 have disagreed to perform to other second nodes of the one or more second nodes 120. The first node 111 may be also configured to send, to each second node of the one or more second nodes 120 having indicated the consent to perform at least one of the respective set of second actions, the respective fourth indication. The respective fourth indication may be configured to indicate the respective set of third actions to be performed according to the modified plan.

In some embodiments of the wireless communications network 100, the first node 111 may be further configured to receive at least one fifth indication from any of the one or more second nodes 120. The fifth indication may be configured to indicate a failure in the execution of any of the plan and the modified plan. The first node 111 may be further configured to modify any of the determined plan and the modified plan according to the fifth indication configured to be received. The first node 111 may be further configured to send, to each second node of the one or more second nodes 120 having indicated the consent to perform at least one of the respective set of second actions, the respective sixth indication. The respective sixth indication may be configured to indicate the respective set of fourth actions to be performed according to the modified original determined plan or the remodified plan.

In some embodiments of the wireless communications network 100, each of the first node 111 and the one or more second nodes 120 may be configured to be Intelligent Autonomous Systems. In such embodiments, to determine may be configured to be based upon the first node 111 being chosen the leader of the one or more second nodes 120.

In some embodiments of the wireless communications network 100, the actions may be configured to comprise at least one of; self-actions, proxy-actions, goto actions, and transfer actions.

In some embodiments of the wireless communications network 100, the second node 121 may be further configured to determine whether or not to consent or disagree to perform the respective set of second actions based on the respective first cost of the respective set of first actions and the respective second cost of the respective set of second actions. The second node 121 may be also configured to send the respective third indication to the first node 111. The respective third indication may be configured to indicate the consent or disagreement to perform the respective set of second actions configured to be determined.

In some embodiments of the wireless communications network 100, the second node 121 may be further configured to receive the respective fourth indication from the first node 111. The respective fourth indication may be configured to indicate the respective set of third actions to be performed according to the plan, configured to be modified based on at least one of: i) at least one of the one or more second nodes 120 having indicated a disagreement to perform the respective set of second actions, and ii) at least one of the one or more second nodes 120 having disagreed to perform at least one of the respective set of second actions.

In some embodiments of the wireless communications network 100, the second node 121 may be further configured to send the fifth indication to the first node 111. The fifth indication may be configured to indicate the failure in the execution of any of the respective set of first actions or the respective set of second actions. The second node 121 may be also configured to receive, from the first node 111 the respective sixth indication. The respective sixth indication may be configured to indicate the respective set of fourth actions to be performed according to the modified original determined plan or the remodified plan.

In some embodiments of the wireless communications network 100, the second node 121 may be further configured to execute the one or more actions of the respective set of second actions, the respective set of third actions, and the respective set of fourth actions.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCES

1. Nesrine Mandoui, Vincent Frémont, Enrico Natalizio, "Cooperative Frontier-Based Exploration Strategy for Multi-Robot System", System of Systems Engineering (SoSE) 2018 13th Annual Conference on, pp. 203-210, 2018.
2. Xieyuanli Chen, Huimin Lu, Junhao Xiao, Hui Zhang, "Distributed Monocular Multi-Robot SLAM", CYBER Technology in Automation Control and Intelligent Systems (CYBER) 2018 IEEE 8th Annual International Conference on, pp. 73-78, 2018.
3. Patrik Schmuck and Margarita Chli, "Multi-UAV collaborative monocular SLAM", 2017 IEEE International Conference on Robotics and Automation (ICRA), Singapore, 2017.
4. André Silva, Ricardo Mendonca and Pedro Santana. "Monocular Trail Detection and Tracking Aided by Visual SLAM for Small Unmanned Aerial Vehicles", Journal of intelligent and Robotic systems, June 2018.

The invention claimed is:

1. A method performed by a first node, the method being to achieve a set of goals in a geographical space, the first node operating in a wireless communications network, the method comprising:
   determining, based on:
   a first goal of the first node achieved in the geographical space according to a first set of capabilities of the first node, and a first set of first actions individually performed by the first node to achieve the first goal, and
   for each second node of one or more second nodes within radio coverage of the first node:
   a respective goal achieved in the geographical space according to a respective set of capabilities of each second node of the one or more second nodes, wherein the respective goal is determined by a respective operator of the second node independently of the first node, and
   a respective set of first actions individually performed by each second node of the one or more second nodes to achieve the respective goal, wherein the respective goal, the respective set of capabilities, and the respective set of first actions are indicated by a respective first indication obtained from each respective second node of the one or more second nodes,
   a plan to collaboratively achieve each of the respective goals of the one or more second nodes and the first goal of the first node in the geographical space, by determining a respective set of second actions respectively performed by each second node of the one or more second nodes and the first node, wherein the determining further comprises aggregating the first goal and the respective goals into the plan and decomposing the plan into the respective sets of second actions based on the respective capabilities of the first node and the one or more second nodes, and sending, to each second node of the one or more second nodes, a respective second indication, the respective second indication indicating the determined respective set of second actions.

2. The method according to claim 1, wherein the determining is based on a first cost of the respective sets of first actions and a second cost of the respective sets of second actions.

3. The method according to claim 1, wherein the determined plan is based on the obtained one or more respective first indications.

4. The method according to claim 1, wherein the method further comprises:

receiving, respectively from each second node of the one or more second nodes, one or more respective third indications, each of the one or more respective third indications indicating, respectively, for each second node of the one or more second nodes a consent or a disagreement to perform the respective set of second actions.

5. The method according to claim 4, wherein at least one of the respective third indications indicates a disagreement to perform the respective set of second actions, and wherein the method further comprises:

modifying the determined plan according to the received one or more respective third indications, by at least one of:

excluding any of the one or more second nodes having indicated a disagreement to perform the respective set of second actions, or assigning the second actions that any of the one or more second nodes have disagreed to perform to other second nodes of the one or more second nodes, sending, to each second node of the one or more second nodes having indicated a consent to perform at least one of the respective set of second actions, a respective fourth indication, the respective fourth indication indicating a respective set of third actions performed according to the modified plan.

6. The method according to claim 5, wherein the method further comprises:

receiving at least one fifth indication from any of the one or more second nodes, the fifth indication indicating a failure in the execution of any of the plan and the modified plan, modifying any of the determined plan and the modified plan according to the received fifth indication, and sending, to each second node of the one or more second nodes having indicated a consent to perform at least one of the respective set of second actions, a respective sixth indication, the respective sixth indication indicating a respective set of fourth actions performed according to the modified original determined plan or the remodified plan.

7. The method according to claim 1, wherein the first actions comprise at least one of: self-actions, proxy-actions, goto actions, or transfer actions.

8. A method performed by a second node, the method being to achieve a set of goals in a geographical space, the second node operating in a wireless communications network, the method comprising:

sending a respective first indication to a first node operating in the wireless communications network, the respective first indication indicating a respective goal of the second node achieved in the geographical space according to a respective set of capabilities of the second node, the respective set of capabilities of the second node, and a respective set of first actions individually performed by the second node to achieve the respective goal, receiving from the first node, a respective second indication, the respective second indication indicating a set of second actions individually performed by the second node, the receiving of the respective second indication being based on the sent respective first indication, and the received respective second indication being based on a plan to collaboratively achieve by the first node and one or more second nodes within radio coverage of the first node:

a first goal of the first node achieved in the geographical space according to a first set of capabilities of the first node, and a respective goal achieved in the geographical space by each of one or more second nodes according to a respective set of capabilities of each second node of the one or more second nodes, wherein the respective goal and the respective set of capabilities are indicated by a respective first indication obtained from each respective second node of the one or more second nodes, wherein the respective goal is determined by a respective operator of the second node independently of the first node, the plan being based on a respective set of second actions respectively performed by each second node of the one or more second nodes and the first node, wherein determining the plan comprising aggregating the first goal and the respective goals into the plan and decomposing the plan into the respective sets of second actions based on the respective capabilities of the first node and the one or more second nodes.

9. The method according to claim 8, and wherein the method further comprises:

determining whether or not to consent or disagree to perform the respective set of second actions based on a respective first cost of the respective set of first actions and a respective second cost of the respective set of second actions, and sending a respective third indication to the first node, the respective third indication indicating the determined consent or disagreement to perform the respective set of second actions.

10. The method according to claim 9, further comprising:

receiving a respective fourth indication from the first node, the respective fourth indication indicating a respective set of third actions performed according to the plan, modified based on at least one of:

at least one of the one or more second nodes having indicated a disagreement to perform the respective set of second actions, or at least one of the one or more second nodes having disagreed to perform at least one of the respective set of second actions.

11. The method according to claim 10, wherein the method further comprises:

sending a fifth indication to the first node, the fifth indication indicating a failure in the execution of any of the respective set of first actions or the respective set of second actions, and receiving, from the first node a respective sixth indication, the respective sixth indication indicating a respective set of fourth actions performed according to the modified original determined plan or the remodified plan.

12. The method according to claim 11, further comprising:

executing one or more actions of the respective set of second actions, the respective set of third actions, and the respective set of fourth actions.

13. The method according to claim 8, wherein each of the first node and the one or more second nodes are Intelligent Autonomous Systems, and wherein the receiving of the respective second indication is based upon the first node being chosen the leader of the one or more second nodes.

14. A first node, for achieving a set of goals in a geographical space, the first node being configured to operate in a wireless communications network, the first node being further configured to:

determine, based on:

a first goal of the first node achieved in the geographical space according to a first set of capabilities of the first node, and a first set of first actions individually performed by the first node to achieve the first goal, and for each second node of one or more second nodes within radio coverage of the first node:

a respective goal achieved in the geographical space according to a respective set of capabilities of each second node of the one or more second nodes, and a respective set of first actions individually performed by each second node of the one or more second nodes to achieve the respective goal, wherein the respective goal, the respective set of capabilities, and the respective set of first actions are indicated by a respective first indication obtained from each respective second node of the one or more second nodes, wherein the respective goal is determined by a respective operator of the second node independently of the first node, a plan to collaboratively achieve each of the respective goals of the one or more second nodes and the first goal of the first node in the geographical space, by determining a respective set of second actions respectively performed by each second node of the one or more second nodes and the first node, wherein the determining further comprises aggregating the first goal and the respective goals into the plan and decomposing the plan into the respective sets of second actions based on the respective capabilities of the first node and the one or more second nodes, and send, to each second node of the one or more second nodes, a respective second indication, the respective second indication being configured to indicate the respective set of second actions configured to determined.

15. The first node according to claim 14, wherein to determine is configured to based on a first cost of the respective sets of first actions and a second cost of the respective sets of second actions.

16. The first node according to claim 14, wherein the plan configured to determined is configured to based on the one or more respective first indications configured to obtained.

17. The first node according to claim 14, wherein the first node is further configured to:

receive, respectively from each second node of the one or more second nodes, one or more respective third indications, each of the one or more respective third indications being configured to indicate, respectively, for each second node of the one or more second nodes a consent or a disagreement to perform the respective set of second actions.

18. The first node according to claim 17, wherein at least one of the respective third indications is configured to indicate a disagreement to perform the respective set of second actions, and wherein the first node is further configured to:

modify the plan configured to determined according to the one or more respective third indications configured to received, by at least one of:

excluding any of the one or more second nodes having indicated a disagreement to perform the respective set of second actions, or assigning the second actions that any of the one or more second nodes have disagreed to perform to other second nodes of the one or more second nodes, send, to each second node of the one or more second nodes having indicated a consent to perform at least one of the respective set of second actions, a respective fourth indication, the respective fourth indication being configured to indicate a respective set of third actions performed according to the modified plan.

19. The first node according to claim 18, wherein the first node is further configured to:

receive at least one fifth indication from any of the one or more second nodes, the fifth indication being configured to indicate a failure in the execution of any of the plan and the modified plan, modify any of the determined plan and the modified plan according to the fifth indication configured to received, and, send, to each second node of the one or more second nodes having indicated a consent to perform at least one of the respective set of second actions, a respective sixth indication, the respective sixth indication being configured to indicate a respective set of fourth actions performed according to the modified original determined plan or the remodified plan.

20. A wireless communications network configured to enable communication between a first node and one or more second nodes comprising a second node for achieving a set of goals in a geographical space, wherein:

the second node is configured to:

send a respective first indication to the first node, the respective first indication being configured to indicate:

a respective goal of the second node achieved in the geographical space according to a respective set of capabilities of the second node, the respective set of capabilities of the second node, and a respective set of first actions individually performed by the second node to achieve the respective goal, the first node is configured to:

determine, based on:

a first goal of the first node achieved in the geographical space according to a first set of capabilities of the first node, and a first set of first actions individually performed by the first node to achieve the first goal, and for each second node of the one or more second nodes within radio coverage of the first node:

a respective goal achieved in the geographical space according to a respective set of capabilities of each second node of the one or more second nodes, and a respective set of first actions individually performed by each second node of the one or more second nodes to achieve the respective goal, wherein the respective goal and the respective set of capabilities are indicated by a respective first indication obtained from each respective second node of the one or more second nodes, wherein the respective goal is determined by a respective operator of the second node independently of the first node, a plan to collaboratively achieve each of the respective goals of the one or more second nodes and the first goal of the first node in the geographical space, by determining a respective set of second actions respectively performed by each second node of the one or more second nodes and the first node, wherein the determining further comprises aggregating the first goal and the respective goals into the plan and decomposing the plan into the respective sets of second actions based on the respective capabilities of the first node and the one or more second nodes, and send, to each second node of the one or more second nodes, a respective second indication, the respective second indication being configured to indicate the respective set of second actions configured to determined, and wherein the second node is further configured to:

receive, from the first node, the respective second indication, the respective second indication being configured to indicate a set of second actions individually performed by the second node.

* * * * *